(12) United States Patent
Doerksen et al.

(10) Patent No.: US 10,343,050 B2
(45) Date of Patent: Jul. 9, 2019

(54) SUSPENSION SYSTEMS FOR ONE-WHEELED VEHICLES

(71) Applicant: Future Motion, Inc., Santa Cruz, CA (US)

(72) Inventors: Kyle Jonathan Doerksen, Santa Cruz, CA (US); Matthew Michael O'Brien, Hermosa Beach, CA (US)

(73) Assignee: Future Motion, Inc., Santa Cruz, CA (US)

( * ) Notice: Subject to any disclaimer, the term of this patent is extended or adjusted under 35 U.S.C. 154(b) by 0 days.

(21) Appl. No.: 16/025,830

(22) Filed: Jul. 2, 2018

(65) Prior Publication Data

US 2019/0168102 A1     Jun. 6, 2019

Related U.S. Application Data

(63) Continuation of application No. 15/832,051, filed on Dec. 5, 2017, now Pat. No. 10,010,784.

(51) Int. Cl.
| | |
|---|---|
| A63C 17/12 | (2006.01) |
| A63C 17/00 | (2006.01) |
| G05D 1/08 | (2006.01) |
| B62D 51/02 | (2006.01) |
| A63C 17/08 | (2006.01) |

(52) U.S. Cl.
CPC .......... *A63C 17/0046* (2013.01); *A63C 17/08* (2013.01); *A63C 17/12* (2013.01); *B62D 51/02* (2013.01); *G05D 1/0891* (2013.01)

(58) Field of Classification Search
CPC ..... A63C 17/0046; A63C 17/08; A63C 17/12; A63C 17/014; A63C 17/017; B62D 51/02
See application file for complete search history.

(56) References Cited

U.S. PATENT DOCUMENTS

| | | | |
|---|---|---|---|
| 1,585,258 A | 5/1926 | Moore | |
| 4,023,864 A | 5/1977 | Lang et al. | |

(Continued)

FOREIGN PATENT DOCUMENTS

| | | |
|---|---|---|
| TW | 450823 B | 8/2001 |
| WO | 93/13974 A1 | 7/1993 |
| WO | 2009071879 A9 | 6/2009 |

OTHER PUBLICATIONS

Ben Smither, "Balancing Scooter / Skateboard", video, retrieved Sep. 22, 2016 from https://www.youtube.com/watch?v= HGbbag9dkIU, uploaded to YouTube on Mar. 4, 2007.

(Continued)

*Primary Examiner* — Katy M Ebner
(74) *Attorney, Agent, or Firm* — Kolitch Romano LLP

(57) ABSTRACT

A self-balancing electric vehicle may include a board having a frame, and a suspension system including at least one four-bar linkage coupling opposing end portions of a hub motor axle to the first end portion of the frame. The four-bar linkage(s) may have a first fixed link connected to the axle, a second fixed link comprising the frame, and two pivotable links joining the first fixed link to the second fixed link, such that the board is configured to be movable up and down relative to the axle. A shock absorber may be coupled to the four-bar linkage(s) and to the first end portion of the frame, such that the shock absorber is configured to damp up and down movement of the board relative to the axle.

20 Claims, 20 Drawing Sheets

(56) References Cited

U.S. PATENT DOCUMENTS

| | | | |
|---|---|---|---|
| 4,039,200 A | 8/1977 | McGonegle | |
| 4,106,786 A * | 8/1978 | Talbott | A63C 17/01 |
| | | | 280/205 |
| 4,109,741 A | 8/1978 | Gabriel | |
| 4,505,477 A * | 3/1985 | Wilkinson | A63B 22/16 |
| | | | 280/87.041 |
| 4,997,196 A | 3/1991 | Wood | |
| 5,000,470 A | 3/1991 | Kamler et al. | |
| 5,119,277 A | 6/1992 | Copley et al. | |
| 5,119,279 A | 6/1992 | Makowsky | |
| 5,132,883 A | 7/1992 | La Lumandier | |
| 5,462,302 A | 10/1995 | Leitner | |
| 5,487,441 A | 1/1996 | Endo et al. | |
| 5,509,679 A | 4/1996 | Leitner | |
| 5,513,080 A | 4/1996 | Magle et al. | |
| 5,553,881 A | 9/1996 | Klassen et al. | |
| 5,628,524 A | 5/1997 | Klassen et al. | |
| 5,794,730 A | 8/1998 | Kamen | |
| 6,017,297 A * | 1/2000 | Collins | A63B 26/003 |
| | | | 482/146 |
| 6,050,357 A | 4/2000 | Staelin et al. | |
| 6,206,397 B1 | 3/2001 | Klassen et al. | |
| 6,223,104 B1 | 4/2001 | Kamen et al. | |
| 6,242,701 B1 | 6/2001 | Breed et al. | |
| 6,288,505 B1 | 9/2001 | Heinzmann et al. | |
| 6,332,103 B1 | 12/2001 | Steenson, Jr. et al. | |
| 6,408,240 B1 | 6/2002 | Morrell et al. | |
| 6,488,301 B2 | 12/2002 | Klassen et al. | |
| 6,536,788 B1 | 3/2003 | Kuncz et al. | |
| 6,538,411 B1 | 3/2003 | Field et al. | |
| 6,553,271 B1 | 4/2003 | Morrell | |
| 6,561,294 B1 | 5/2003 | Kamen et al. | |
| 6,779,621 B2 | 8/2004 | Kamen et al. | |
| 6,789,640 B1 | 9/2004 | Arling et al. | |
| 6,827,163 B2 | 12/2004 | Amsbury et al. | |
| 6,848,527 B2 * | 2/2005 | Nelson | A63C 17/004 |
| | | | 180/180 |
| 6,874,591 B2 | 4/2005 | Morrell et al. | |
| 6,932,371 B2 | 8/2005 | Perez | |
| 6,965,206 B2 | 11/2005 | Kamen et al. | |
| 6,992,452 B1 | 1/2006 | Sachs et al. | |
| 7,023,330 B2 | 4/2006 | Kamen et al. | |
| 7,053,289 B2 | 5/2006 | Iwai et al. | |
| RE39,159 E | 7/2006 | Klassen et al. | |
| 7,090,040 B2 | 8/2006 | Kamen et al. | |
| 7,091,724 B2 | 8/2006 | Heinzmann et al. | |
| 7,130,702 B2 | 10/2006 | Morrell | |
| 7,138,774 B2 | 11/2006 | Negoro et al. | |
| 7,157,875 B2 | 1/2007 | Kamen et al. | |
| 7,172,044 B2 * | 2/2007 | Bouvet | A63C 17/12 |
| | | | 180/15 |
| 7,198,280 B2 | 4/2007 | Hara | |
| 7,263,453 B1 | 8/2007 | Gansler et al. | |
| D551,592 S | 9/2007 | Chang et al. | |
| 7,424,927 B2 | 9/2008 | Hiramatsu | |
| 7,467,891 B2 | 12/2008 | Hiramatsu | |
| 7,479,097 B2 * | 1/2009 | Rosborough | A63B 22/16 |
| | | | 446/396 |
| 7,581,743 B2 | 9/2009 | Graney | |
| 7,740,099 B2 | 6/2010 | Field et al. | |
| 7,757,794 B2 | 7/2010 | Heinzmann et al. | |
| 7,789,174 B2 | 9/2010 | Kamen et al. | |
| 7,811,217 B2 * | 10/2010 | Odien | A63B 21/0058 |
| | | | 482/147 |
| 7,857,088 B2 | 12/2010 | Field et al. | |
| 7,900,725 B2 | 3/2011 | Heinzmann et al. | |
| 7,962,256 B2 | 6/2011 | Stevens et al. | |
| 7,963,352 B2 | 6/2011 | Alexander | |
| 7,979,179 B2 | 7/2011 | Gansler | |
| 8,052,293 B2 | 11/2011 | Hurwitz | |
| 8,066,297 B2 | 11/2011 | Beale et al. | |
| 8,083,313 B2 | 12/2011 | Karppinen et al. | |
| 8,146,696 B2 | 4/2012 | Kaufman | |
| 8,170,780 B2 * | 5/2012 | Field | B60N 2/045 |
| | | | 701/124 |
| 8,272,657 B2 | 9/2012 | Graney et al. | |
| 8,382,136 B2 | 2/2013 | Beale et al. | |
| 8,467,941 B2 | 6/2013 | Field et al. | |
| 8,490,723 B2 | 7/2013 | Heinzmann et al. | |
| 8,562,386 B2 | 10/2013 | Carlson et al. | |
| 8,579,306 B2 * | 11/2013 | Lewis | A63C 17/0046 |
| | | | 280/87.042 |
| 8,682,487 B2 | 3/2014 | Kurth et al. | |
| 8,991,541 B1 * | 3/2015 | Maier | A63C 5/08 |
| | | | 180/181 |
| 9,101,817 B2 * | 8/2015 | Doerksen | A63C 17/12 |
| 9,211,470 B2 * | 12/2015 | Bigler | A63C 17/12 |
| D746,928 S | 1/2016 | Doerksen | |
| 9,400,505 B2 | 7/2016 | Doerksen | |
| 9,452,345 B2 * | 9/2016 | Doerksen | A63C 17/01 |
| D768,252 S * | 10/2016 | Bigler | D21/760 |
| D769,997 S | 10/2016 | Doerksen | |
| 9,643,077 B2 * | 5/2017 | Bigler | A63C 17/014 |
| 9,707,470 B2 * | 7/2017 | Ma | B62K 11/007 |
| 9,861,877 B2 * | 1/2018 | Doerksen | A63C 17/01 |
| 9,962,597 B2 * | 5/2018 | Doerksen | B62K 25/00 |
| 2004/0178603 A1* | 9/2004 | Yan | B62M 1/30 |
| | | | 280/221 |
| 2005/0121238 A1* | 6/2005 | Ishii | A63C 17/08 |
| | | | 180/65.1 |
| 2005/0241864 A1 | 11/2005 | Hiramatsu | |
| 2005/0242538 A1* | 11/2005 | Hiramatsu | A63C 17/004 |
| | | | 280/92 |
| 2006/0038520 A1 | 2/2006 | Negoro et al. | |
| 2006/0049595 A1 | 3/2006 | Crigler et al. | |
| 2006/0170174 A1 | 8/2006 | Hiramatsu | |
| 2006/0213711 A1 | 9/2006 | Hara | |
| 2006/0260862 A1 | 11/2006 | Nishikawa | |
| 2007/0194558 A1 | 8/2007 | Stone et al. | |
| 2007/0254789 A1* | 11/2007 | Odien | A63B 21/0058 |
| | | | 482/146 |
| 2009/0261557 A1 | 10/2009 | Beale et al. | |
| 2010/0207348 A1* | 8/2010 | Othman | A63C 17/12 |
| | | | 280/216 |
| 2011/0109060 A1 | 5/2011 | Earle et al. | |
| 2011/0309772 A1 | 12/2011 | Forgey | |
| 2012/0232734 A1 | 9/2012 | Pelletier | |
| 2013/0081891 A1 | 4/2013 | Ulmen et al. | |
| 2013/0175943 A1 | 7/2013 | Tackett | |
| 2015/0175233 A1* | 6/2015 | Ungar | B62K 1/00 |
| | | | 180/181 |
| 2016/0136508 A1* | 5/2016 | Bigler | A63C 17/014 |
| | | | 180/181 |
| 2016/0318562 A1* | 11/2016 | Mainville | B62D 51/001 |
| 2016/0339328 A1* | 11/2016 | Simeray | A63C 17/0093 |
| 2017/0056756 A1* | 3/2017 | Pikulski | A63C 17/12 |
| 2017/0120139 A1 | 5/2017 | Ma | |
| 2017/0209774 A1* | 7/2017 | Stocchi | A63C 17/08 |
| 2017/0361205 A1* | 12/2017 | Bigler | A63C 17/265 |
| 2018/0056169 A1* | 3/2018 | Doerksen | A63C 17/12 |
| 2019/0037769 A1* | 2/2019 | Wenzel | B62D 51/02 |

OTHER PUBLICATIONS www.electricunicycle.com, "Leviskate self-balancing one-wheel skateboard", video, retrieved Sep. 22, 2016 from https://www.youtube.com/watch?v=462Jj1xSSqc, uploaded to YouTube on Aug. 5, 2007.

John Xenon, "One wheel self balancing skateboard Ver2 Jan. 2009. #2", video, retrieved Sep. 22, 2016 from https://www.youtube.com/watch?v=8RPFNUsuW78, uploaded to YouTube on Jan. 3, 2009.

Rodger Cleye, "Leviskate (Balancing Skateboard) in Operation", video, retrieved Sep. 22, 2016 from https://www.youtube.com/watch?v=eN2J8m_E0go, uploaded to YouTube on Apr. 18, 2013.

U.S. Patent and Trademark Office, Office action in U.S. Appl. No. 14/266,641, dated Jul. 23, 2014, which is another application of Applicant Future Motion, Inc.

U.S. Patent and Trademark Office, First Action Interview Pilot Program Pre-Interview Communication in U.S. Appl. No. 14/266,641, dated Aug. 6, 2014, which is another application of Applicant Future Motion, Inc.

(56) References Cited

OTHER PUBLICATIONS

U.S. Receiving Office, International Search Report and Written Opinion of the International Searching Authority from the in PCT/US2014/036244, dated Sep. 11, 2014, which is an international application of Applicant Future Motion, Inc.
U.S. Patent and Trademark Office, Office action in U.S. Appl. No. 14/266,641, dated Oct. 29, 2014, which is another application of Applicant Future Motion, Inc.
U.S. Patent and Trademark Office, final Office action in U.S. Appl. No. 14/266,641, dated Dec. 17, 2014, which is another application of Applicant Future Motion, Inc.
U.S. Patent and Trademark Office, Office action in U.S. Appl. No. 14/266,641, dated Feb. 12, 2015, which is another application of Applicant Future Motion, Inc.
U.S. Patent and Trademark Office, Office action in U.S. Appl. No. 14/805,044, dated Sep. 30, 2015, which is another application of Applicant Future Motion, Inc.
U.S. Patent and Trademark Offic, Office action in U.S. Appl. No. 15/184,906, dated Sep. 21, 2016, which is another application of Applicant Future Motion, Inc.
Taiwan Intellectual Property Office, Office action in Taiwan Divisional Patent Application No. 106100603, dated Jan. 26, 2017, which is a foreign application of Applicant Future Motion, Inc.
U.S. Patent and Trademark Office, Notice of Allowance and Fee(s) Due in U.S. Appl. No. 15/184,866, dated Jan. 27, 2017, which is another application of Applicant Future Motion, Inc.
U.S. Patent and Trademark Office, Office action in U.S. Appl. No. 15/612,321, dated Jul. 17, 2017, which is another application of Applicant Future Motion, Inc.
U.S. Receiving Office, International Search Report and Written Opinion of the International Searching Authority, dated Jan. 24, 2019, in PCT/US2018/063934, which is the international application to this U.S. application.

\* cited by examiner

US 10,343,050 B2

SUSPENSION SYSTEMS FOR ONE-WHEELED VEHICLES

FIELD

This disclosure relates to systems and methods for isolating a one-wheeled vehicle frame from certain effects of uneven terrain. More specifically, the disclosed embodiments relate to suspension systems for one-wheeled vehicles.

SUMMARY

The present disclosure provides systems, apparatuses, and methods relating to suspension systems for one-wheeled vehicles.

In some embodiments, a self-balancing electric vehicle may include: a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board; a wheel assembly including exactly one wheel rotatable on an axle, wherein the wheel is disposed between and extends above and below the first and second deck portions; a motor assembly configured to rotate the wheel about the axle to propel the vehicle; at least one sensor configured to measure an orientation of the board; a motor controller configured to receive board orientation information measured by the at least one sensor and to cause the motor assembly to propel the vehicle based on the board orientation information; a suspension system including a pair of four-bar linkages coupling opposing end portions of the axle to the first end portion of the frame, each of the four-bar linkages having a first fixed link connected to the axle, a second fixed link comprising the frame, and two pivotable links joining the first fixed link to the second fixed link, such that the board is configured to be movable up and down relative to the axle; and a shock absorber having a first end coupled to the pair of four-bar linkages and a second end coupled to the first end portion of the frame, such that the shock absorber is configured to damp up and down movement of the board relative to the axle.

In some embodiments, a self-balancing electric vehicle may include: a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board; a wheel assembly including exactly one wheel rotatable on an axle, wherein the board is tiltable about a fulcral axis defined by the axle and the wheel is disposed between and extends above and below the first and second deck portions; a motor assembly configured to rotate the wheel about the axle to propel the vehicle; at least one sensor configured to measure a tilting orientation of the board; a motor controller configured to receive tilting orientation information measured by the at least one sensor and to cause the motor assembly to propel the vehicle based on the tilting orientation information; a suspension system including a four-bar linkage coupling an end portion of the axle to the first end portion of the frame, the four-bar linkage having a first fixed link connected to the axle, a second fixed link comprising the frame, and two pivotable links joining the first fixed link to the second fixed link, such that the board is configured to move generally vertically relative to the axle; and a shock absorber having a first end coupled to the four-bar linkage and a second end coupled to the first end portion of the frame, such that the shock absorber is configured to damp generally vertical movement of the board relative to the axle.

In some embodiments, a method of reducing the impact of uneven terrain on an electric vehicle may include: propelling a one-wheeled vehicle using a motor assembly of the vehicle to rotate a wheel about an axle oriented generally perpendicular to a direction of travel of the vehicle, the vehicle comprising a board tiltable about a fulcral axis defined by the axle, a first deck portion disposed at a first end portion of a frame of the board, and a second deck portion disposed at a second end portion of the frame of the board, such that the wheel is disposed between and extends above and below the first and second deck portions, wherein the first and second deck portions are each configured to receive a left or right foot of a rider oriented generally parallel to the fulcral axis; causing the motor assembly to propel the vehicle based on board tilt information determined by an onboard tilt sensor; in response to the wheel encountering an uneven support surface while being propelled, allowing generally vertical movement of the board relative to the axle using a suspension system, wherein the suspension system includes a four-bar linkage coupling an end portion of the axle to the first end portion of the frame, the four-bar linkage having a first fixed link connected to the axle, a second fixed link comprising the frame, and two pivotable links joining the first fixed link to the second fixed link; and damping the generally vertical movement of the board relative to the axle using a shock absorber having a first end coupled to the four-bar linkage and a second end coupled to the first end portion of the frame.

Features, functions, and advantages may be achieved independently in various embodiments of the present disclosure, or may be combined in yet other embodiments, further details of which can be seen with reference to the following description and drawings.

DESCRIPTION

Figure 1:
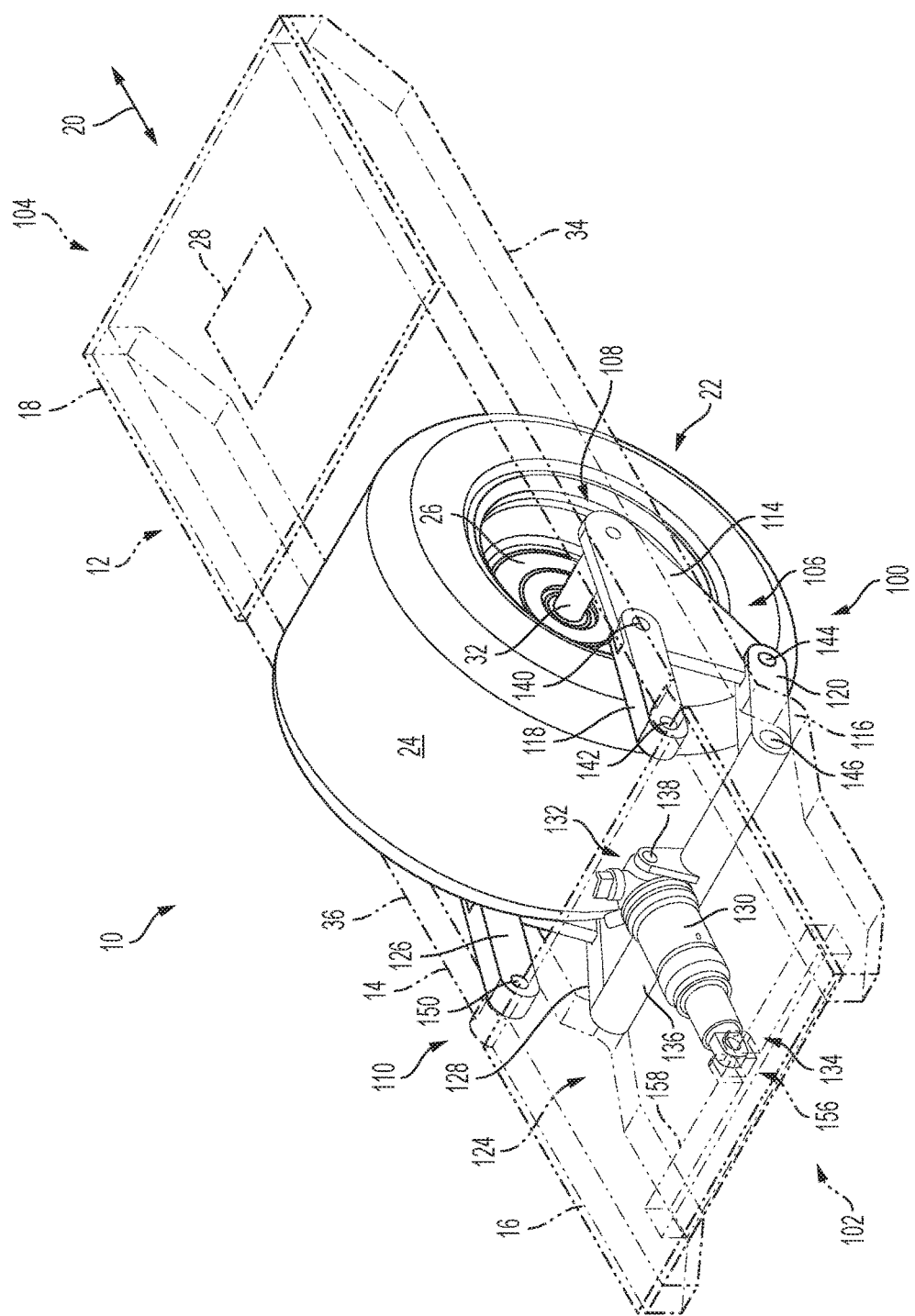
FIG. 1 is an isometric view of an illustrative one-wheeled electric vehicle having a first suspension system in accordance with aspects of the present disclosure.

Various aspects and examples of suspension systems for one-wheeled vehicles, as well as related methods, are described below and illustrated in the associated drawings. Unless otherwise specified, a suspension system and/or its various components may, but are not required to, contain at least one of the structures, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

The terms "up," "down," "inboard," "outboard," "over," "under," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, terms such as "over" and "under" or "above" and "below" should be interpreted with respect to the vehicle in its normal riding position on an underlying support surface. In the absence of a host vehicle, the same directional terms may be used as if the vehicle were present. For example, even when viewed in isolation, a component may have a "top" edge, based on the fact that the component would be installed with the edge in question facing in upward.

"Coupled" means connected, either permanently or releasably, whether directly or indirectly through intervening components.

Overview

In general, suspension systems according to the present teachings may be suitable for one-wheeled electric vehicles, such as a vehicle 10 depicted in FIGS. 1-8, a vehicle 10' depicted in FIGS. 9-17, and a vehicle 10" depicted in FIGS. 18-29. Apart from the various suspension systems, described further below, the construction of vehicles 10, 10', and 10" is substantially the same. Accordingly, for ease of understanding, reference will be made below specifically (where appropriate) only to vehicle 10. Corresponding components and features in vehicles 10' and 10" will have corresponding primed and double-primed reference numbers, respectively.

Vehicle 10 is a one-wheeled, self-stabilizing skateboard substantially similar (in its non-suspension aspects) to the electric vehicles described in U.S. Pat. No. 9,101,817 (the '817 patent), the entirety of which is hereby incorporated herein for all purposes. Accordingly, vehicle 10 includes a tiltable board 12 defining a riding plane and having a frame 14 supporting a first deck portion 16 and a second deck portion 18 (collectively referred to as the foot deck). Each deck portion 16, 18 is configured to receive a left or right foot of a rider oriented generally perpendicular to a direction of travel of the board, said direction of travel generally indicated at 20.

Vehicle 10 also includes a wheel assembly 22. Wheel assembly 22 includes a rotatable ground-contacting element 24 (e.g., a tire, wheel, or continuous track) disposed between and extending above the first and second deck portions 16, 18, and a hub motor 26 configured to rotate ground-contacting element 24 to propel the vehicle. As shown in FIG. 1, vehicle 10 may include exactly one ground-contacting element. In some examples, vehicle 10 may include two wheels disposed side by side (either adjacently or spaced apart) and sharing a common axis of rotation.

As described in the '817 patent, vehicle 10 includes an electrical and electronic component system 28, comprising at least one sensor configured to measure orientation information of the board, and a motor controller configured to receive orientation information measured by the sensor and to cause hub motor 26 to propel the skateboard based on the orientation information. Further details regarding electrical system 28 are described with respect to FIG. 30.

Frame 14 may include any suitable structure configured to rigidly support the deck portions and to be coupled to an axle 32 of the wheel assembly, such that the weight of a rider may be supported on board 12 having a fulcrum (also referred to as a fulcral axis) at the wheel assembly axle. Frame 14 may include one or more frame members, such as frame members 34 and 36, on which deck portions 16 and 18 may be mounted, and which may further support additional elements and features of the vehicle, such as a charging port, end bumpers, lighting assemblies, battery and electrical systems, electronics, controllers, and the like (not shown).

Deck portions 16 and 18 may include any suitable structures configured to support the feet of a rider, such as non-skid surfaces, as well as vehicle-control features, such as a rider detection system. Illustrative deck portions, including suitable rider detection systems, are described in the '817 patent, as well as in U.S. Pat. No. 9,452,345, the entirety of which is hereby included herein for all purposes.

Axle 32 (also referred to as a shaft) of hub motor 26 is coupled to frame 14 by a suspension system, damped by a damper or shock absorber. Various aspects and examples relating to suitable suspension systems are described in greater detail below.

Examples, Components, and Alternatives

The following sections describe selected aspects of exemplary suspension systems for one-wheeled vehicles, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. First Illustrative Suspension System: Four-Bar Linkage

Figure 2:
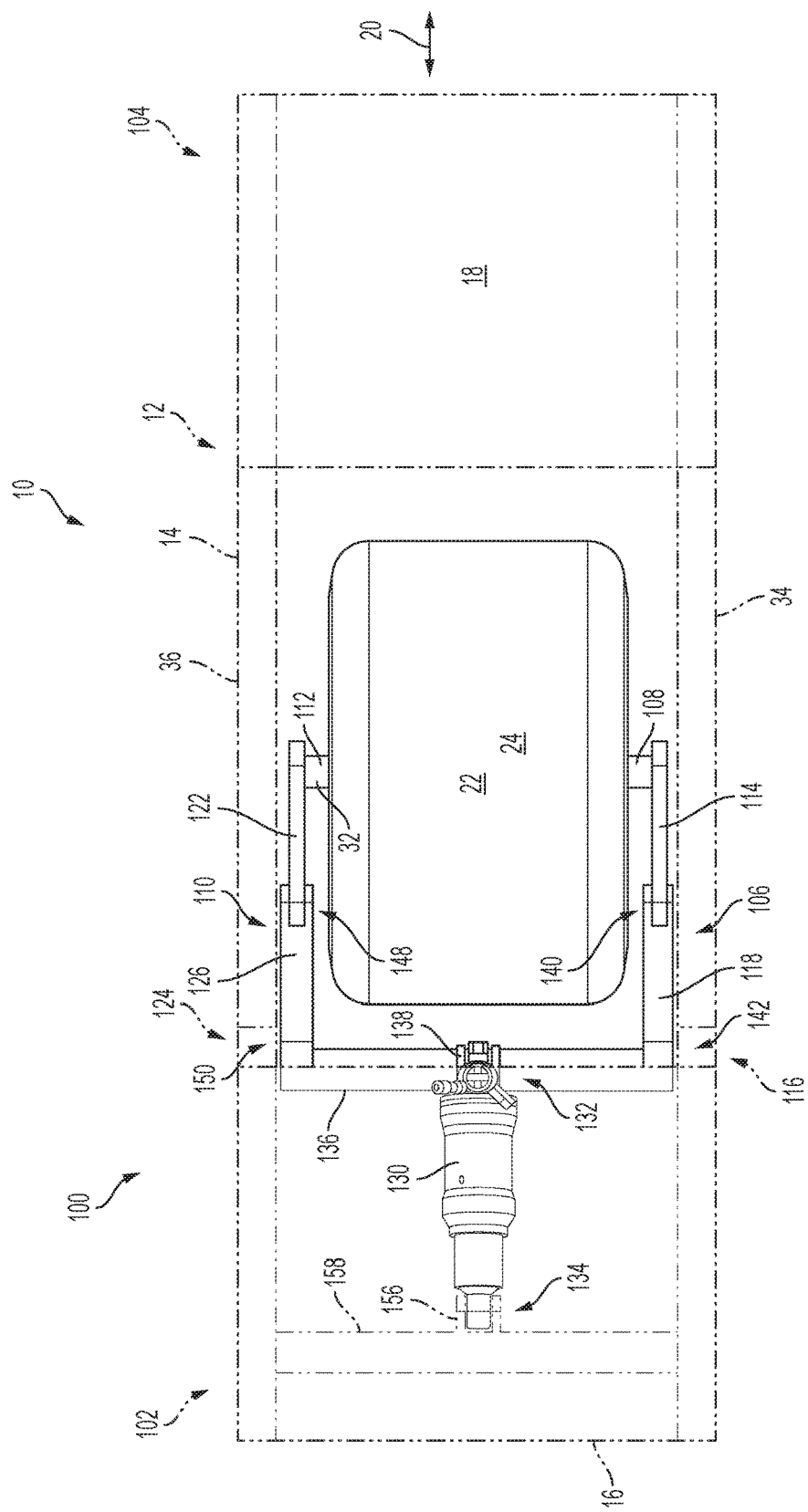
FIG. 2 is a top plan view of the vehicle of FIG. 1.
Figure 3:
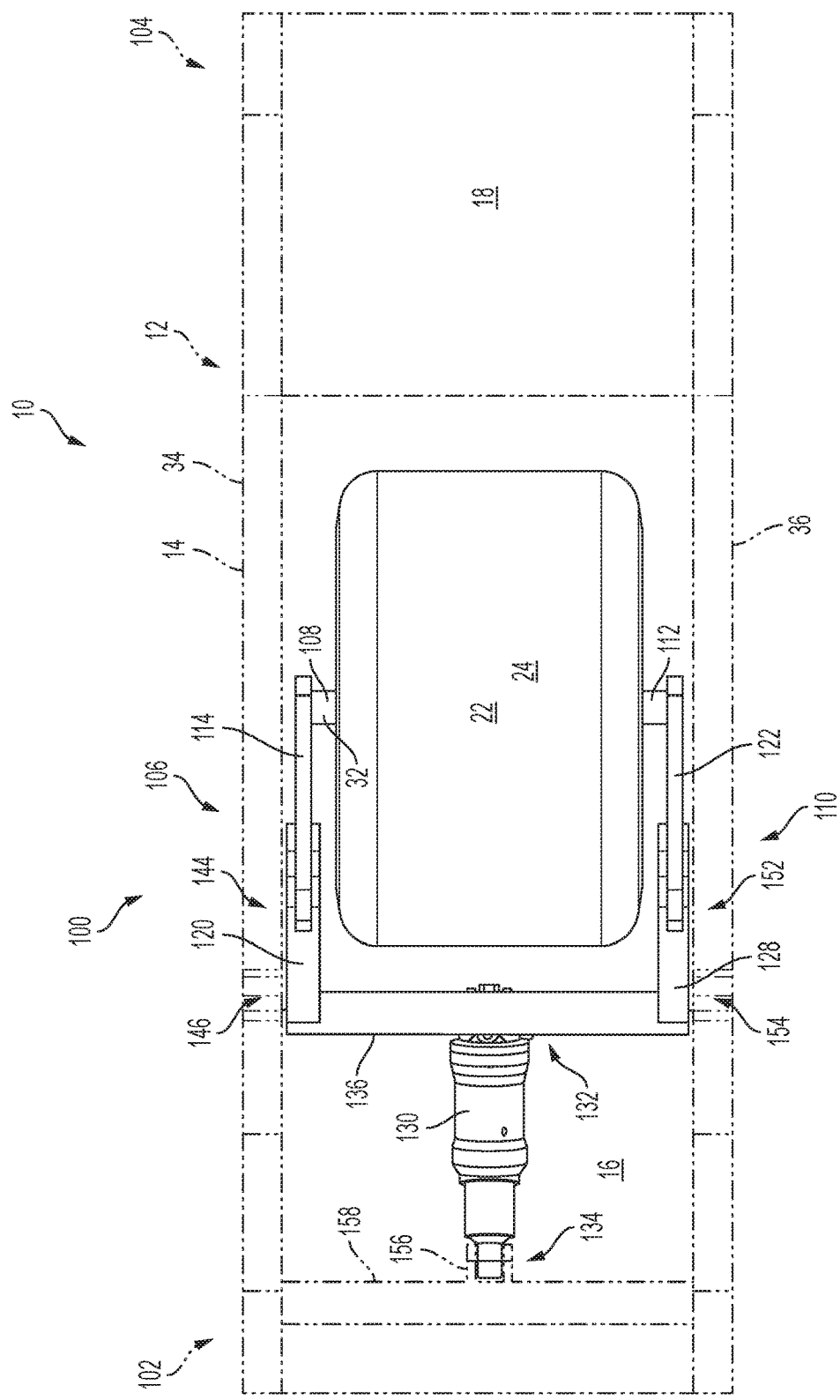
FIG. 3 is a bottom plan view of the vehicle of FIG. 1.
Figure 4:
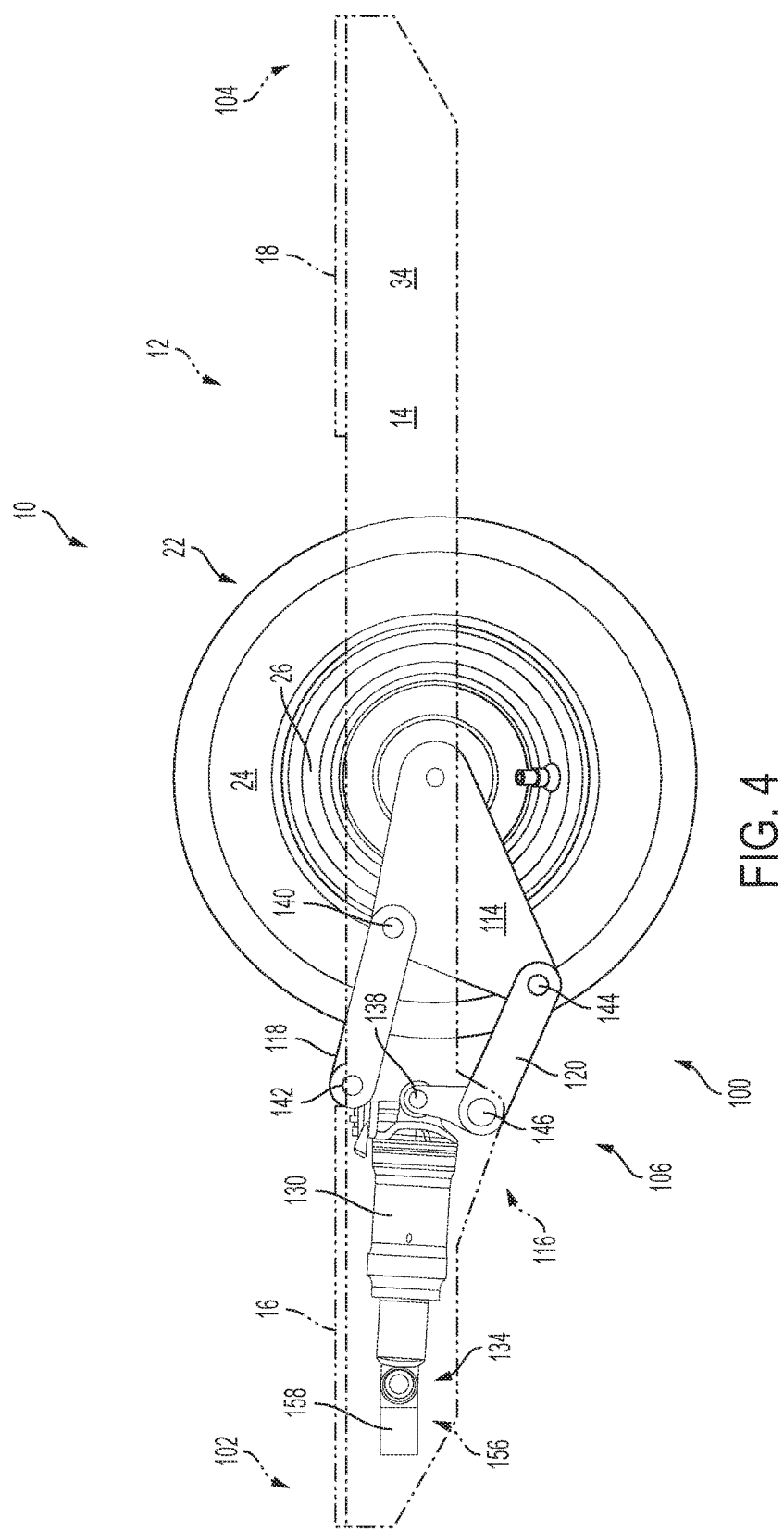
FIG. 4 is a side elevation view of the vehicle of FIG. 1.
Figure 5:
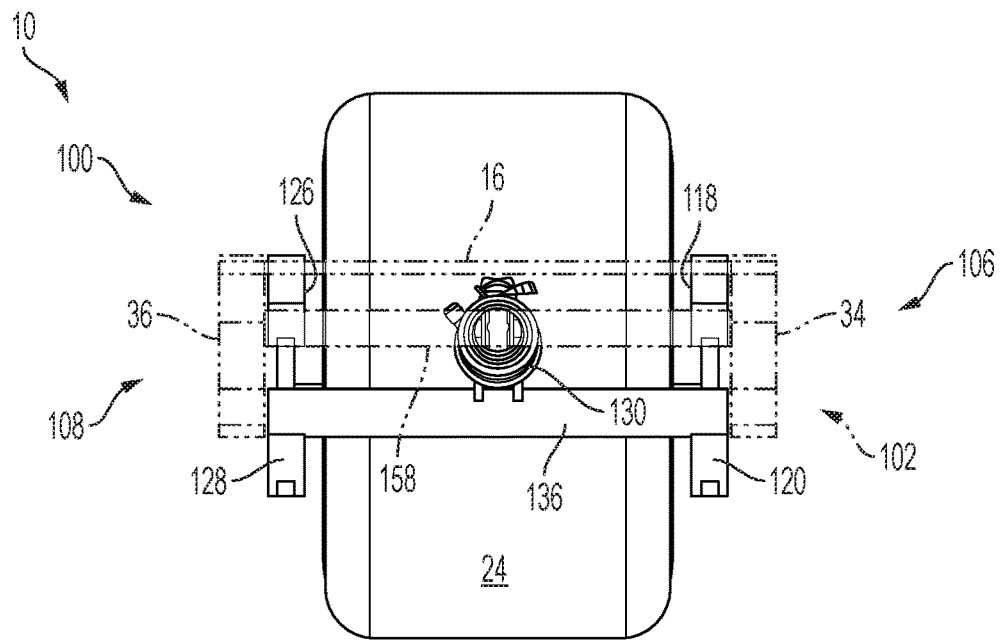
FIG. 5 is an end elevation view of the vehicle of FIG. 1, taken from a first end.
Figure 6:
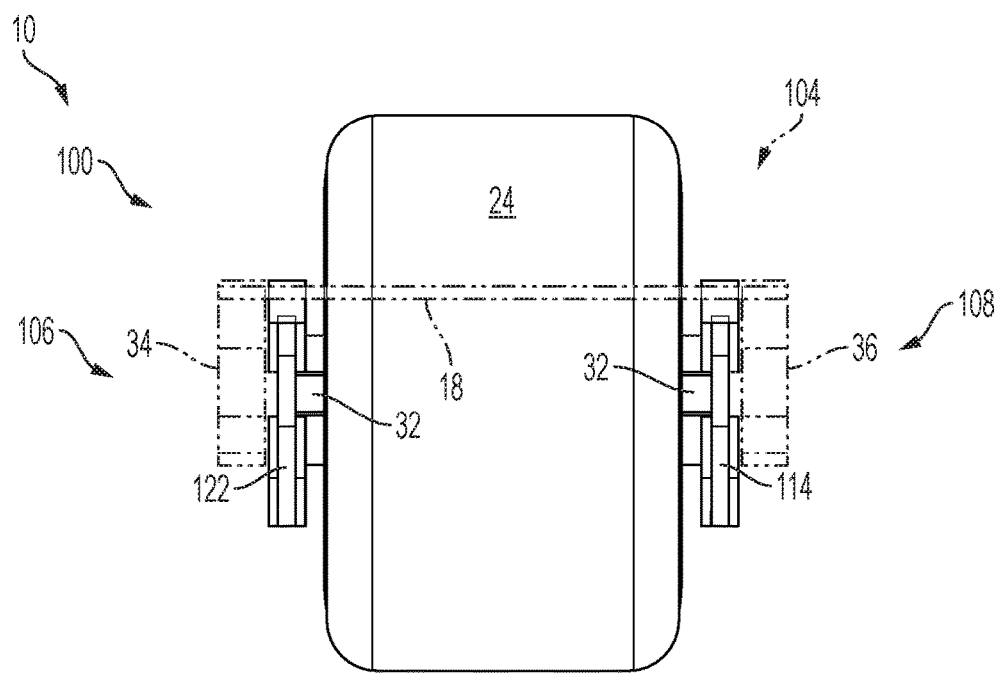
FIG. 6 is an end elevation view of the vehicle of FIG. 1, taken from a second end.
Figure 7:
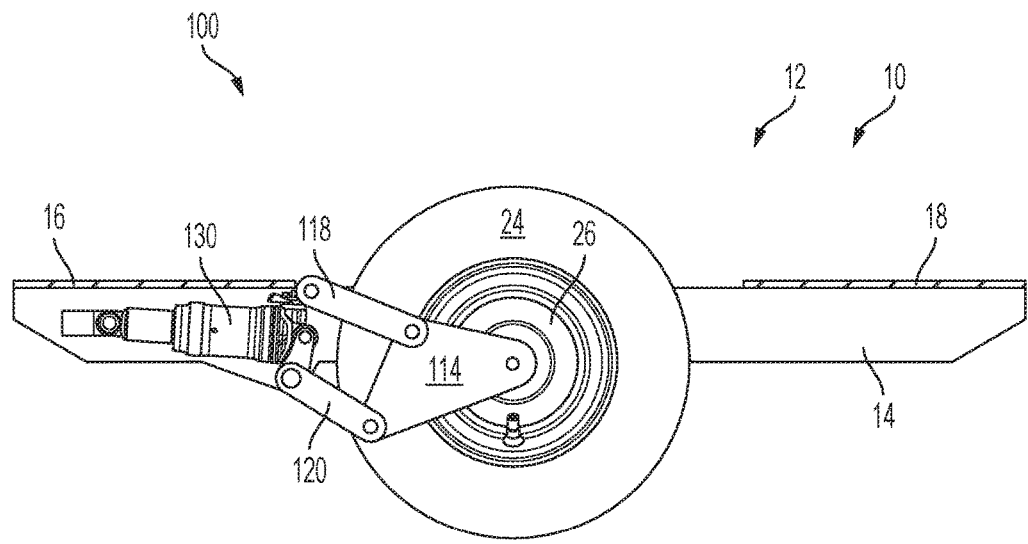
FIG. 7 is a side elevation view of the vehicle of FIG. 1 with the suspension system in a first configuration.
Figure 8:
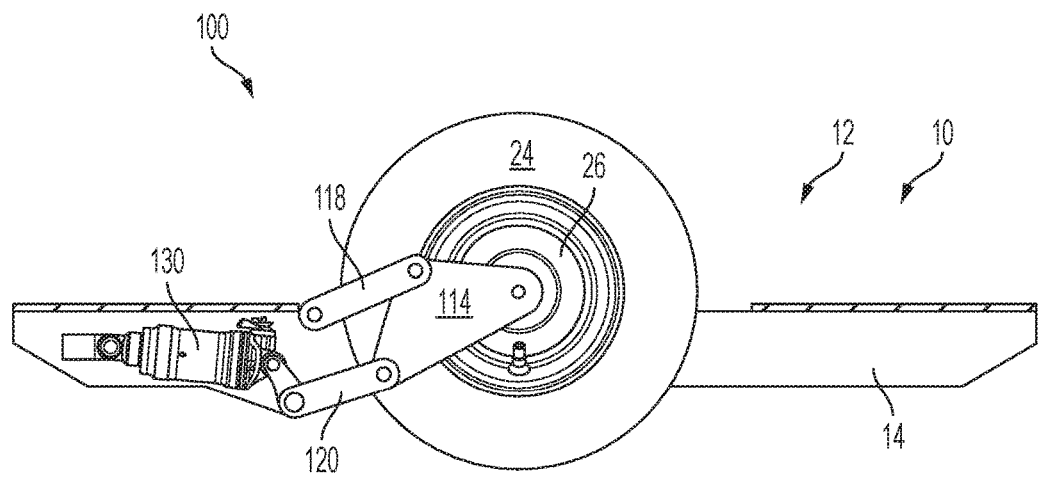
FIG. 8 is a side elevation view of the vehicle of FIG. 1 with the suspension system in a second configuration.

As shown in FIGS. 1-8, this section describes a first illustrative suspension system 100 incorporated into vehicle 10. FIG. 1 is an isometric view of vehicle 10 and suspension system 100. FIG. 2 is a top plan view, FIG. 3 is a bottom plan view, and FIG. 4 is a side elevation view. FIGS. 5 and 6 are end elevation views of vehicle 10. FIGS. 7 and 8 are side elevation views of the vehicle with the suspension system in two different configurations (i.e., neutral and compressed).

As described above, vehicle 10 includes board 12 having frame 14. First deck portion 16 is disposed at a first end portion 102 of the frame, and second deck portion 18 is disposed at a second end portion 104 of the frame. Wheel assembly 22 includes exactly one wheel (wheel 24) rotatable on axle 32, and the wheel is disposed between and extends above and below the first and second deck portions. Motor assembly 26 is configured to rotate the wheel about the axle to propel the vehicle, based on board orientation.

Suspension system 100 includes a pair of four-bar linkages coupling opposing end portions of the axle to the first end portion of the frame. Specifically, a first four-bar linkage 106 couples a first end portion 108 of axle 32 to first end portion 102, and a second four-bar linkage 110 couples a second end portion 112 of axle 32 to second end portion 104. Four-bar linkage 106 is a planar four-bar linkage having a first fixed link 114 connected to axle 32, a second fixed link 116 comprising frame 14, and two pivotable links 118, 120 joining the first fixed link to the second fixed link. Similarly, four-bar linkage 110 is a planar four-bar linkage having a first fixed link 122 connected to axle 32, a second fixed link 124 comprising frame 14, and two pivotable links 126, 128 joining the first fixed link to the second fixed link. The movable links of four-bar linkages 106 and 110 move in generally parallel planes, orthogonal to the riding plane defined by board 12. Accordingly, board 12 is configured to be movable up and down relative to axle 32.

This movement is damped by a shock absorber 130 having a first end 132 coupled to the pair of four-bar linkages and a second end 134 coupled to the first end portion of the frame. In this example, first end 132 of shock absorber 130, also referred to as a compressible shock or compressible shock absorber, is coupled at a rotating joint 138 to a transverse member 136 that joins pivotable links 120 and 128. Transverse member 136 may be fixed to or of a piece with links 120 and 128, such that transverse member 136 rotates when links 120 and 128 pivot. In some examples, transverse member 136 and pivotable links 120, 128 collectively form a U-shaped swing arm. Rotating joint 138 may be offset from the transverse member, such that rotation of the transverse member causes rotating joint 138 to move toward and away from first end 102 of frame 14.

As depicted in FIGS. 1-8, each of the pivotable links is coupled to the first fixed link by a first rotating joint and to the frame by a second rotating joint. Specifically, upper pivotable link 118 is coupled to first fixed link 114 by a first rotating joint 140 and coupled to second fixed link 116 by a second rotating joint 142. Lower pivotable link 120 is coupled to first fixed link 114 by a first rotating joint 144 and coupled to second fixed link 116 by a second rotating joint 146. On the other side of the vehicle, upper pivotable link 126 is coupled to first fixed link 122 by a first rotating joint 148 and coupled to second fixed link 124 by a second rotating joint 150. Lower pivotable link 128 is coupled to first fixed link 122 by a first rotating joint 152 and coupled to second fixed link 124 by a second rotating joint 154. In this embodiment, for each of the four-bar linkages, the first rotating joints are spaced farther apart than the second rotating joints. However, any suitable spacing may be utilized, depending on the motion desired. This spacing may be facilitated by the shape and size of the first fixed link. Specifically, first fixed links 114, 122 have a generally triangular shape, with a smaller end fixed at the axle and a larger end extending toward first end portion 102 of frame 14.

Shock absorber 130 may be oriented generally parallel to the direction of travel of the vehicle, and second end 134 of the shock absorber may be coupled to frame 14 at a pivotable joint 156 of a fixed transverse frame member 158. The shock absorber may be coupled to the frame using any suitable structure or mechanism. Examples of shock absorber 130 may include any suitable compressible shock configured to damp the expected movement of suspension system 100 and to bias the system in an operating configuration. For example, shock absorber 130 may include a gas shock or a gas spring.

In some examples, the pivotable links may be referred to as rockers, such that each of the four-bar linkages comprises a double-rocker four-bar linkage. In some examples, rotating joints may be referred to as revolute joints. As depicted in FIGS. 1-8, frame 14 may be coupled to the wheel assembly by only suspension system 100. In some examples, second end portion 104 of the frame is unconnected or free-floating with respect to the suspension system.

Based on the above description of vehicle 10 and suspension system 100, steps of a method for reducing the impact of uneven terrain on an electric vehicle will now be described. A first step of the method includes propelling a one-wheeled vehicle using a motor assembly of the vehicle to rotate a wheel about an axle oriented generally perpendicular to a direction of travel of the vehicle. As described with respect to vehicle 10, the vehicle has a board tiltable about a fulcral axis defined by the axle, a first deck portion disposed at a first end portion of a frame of the board, and a second deck portion disposed at a second end portion of the frame of the board. The wheel is disposed between and extends above and below the first and second deck portions. The first and second deck portions are each configured to receive a left or right foot of a rider oriented generally parallel to the fulcral axis (i.e., generally perpendicular to the direction of travel). A second step of the method includes causing the motor assembly to propel the vehicle based on board tilt information determined by an onboard tilt sensor. A third step of the method includes, in response to the wheel encountering an uneven support surface while being propelled, allowing generally vertical movement of the board relative to the axle using a suspension system. As described with respect to system 100, the suspension system includes a four-bar linkage coupling an end portion of the axle to the first end portion of the frame. This four-bar linkage has a first fixed link connected to the axle, a second fixed link comprising the frame, and two pivotable links joining the first fixed link to the second fixed link. A fourth step of the method includes damping the generally vertical movement of the board relative to the axle using a shock absorber. As described, the shock absorber has a first end coupled to the four-bar linkage and a second end coupled to the first end portion of the frame.

With specific reference to FIGS. 7 and 8, relative motion of board 12 with respect to axle 32 is depicted. In FIGS. 7 and 8, one of the side frame members has been removed to better show the underlying components. FIG. 7 depicts vehicle 10 with suspension system 100 in a neutral configuration. Shock absorber 130 is extended, and pivotable links 118 and 120 angle upward from the first fixed link to the frame. FIG. 8 depicts vehicle 10 with suspension system 100 in a compressed configuration, where wheel 24 has been forced upward relative to board 12, and the pivotable links have pivoted downward. By pivoting in this fashion, transverse member 136 is rotated counterclockwise with respect to the drawings, thereby pivoting offset joint 138 and compressing shock absorber 130.

B. Second Illustrative Suspension System: Watt's Linkage

Figure 9:
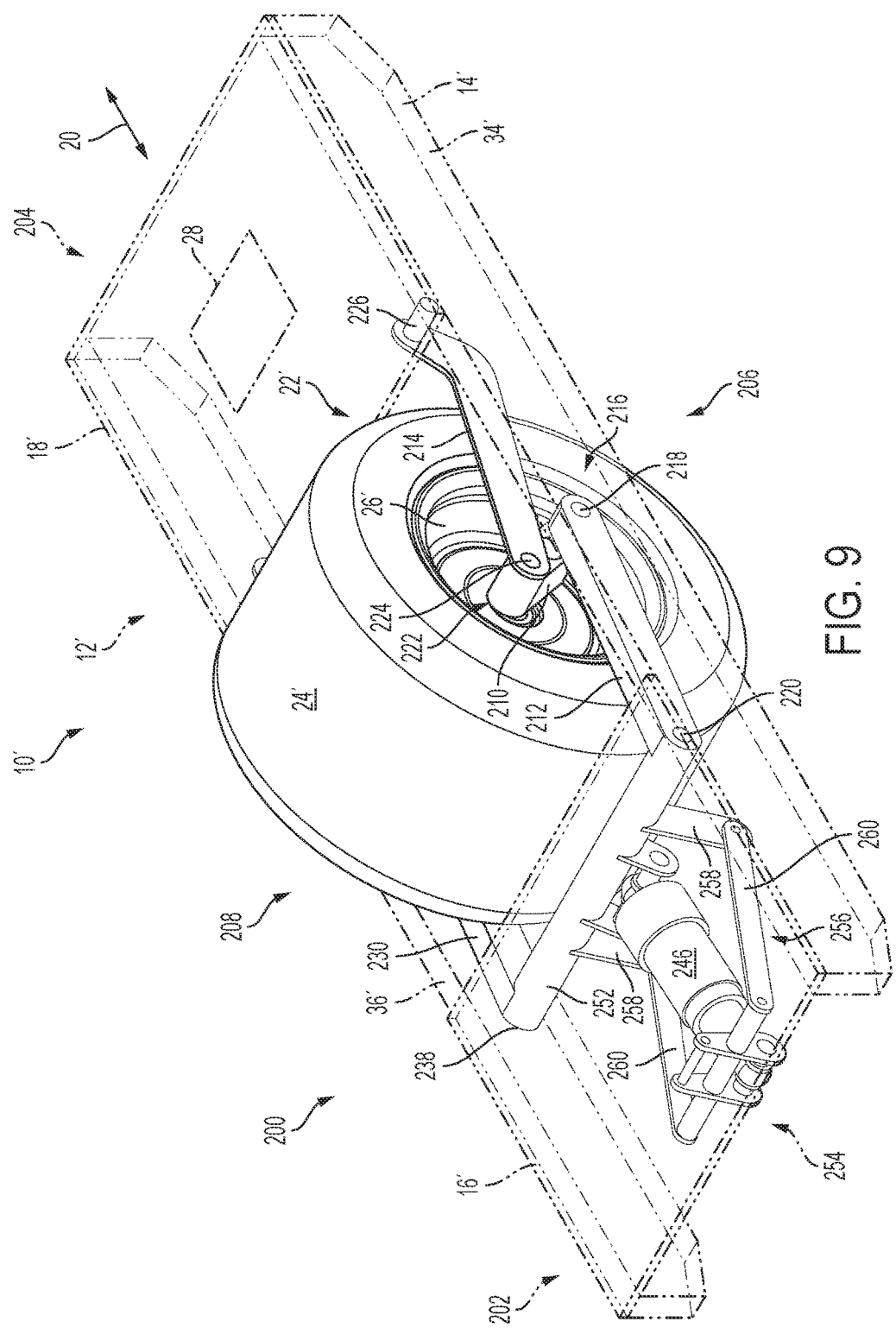
FIG. 9 is an isometric view of another illustrative one-wheeled electric vehicle having a second suspension system in accordance with aspects of the present disclosure.
Figure 10:
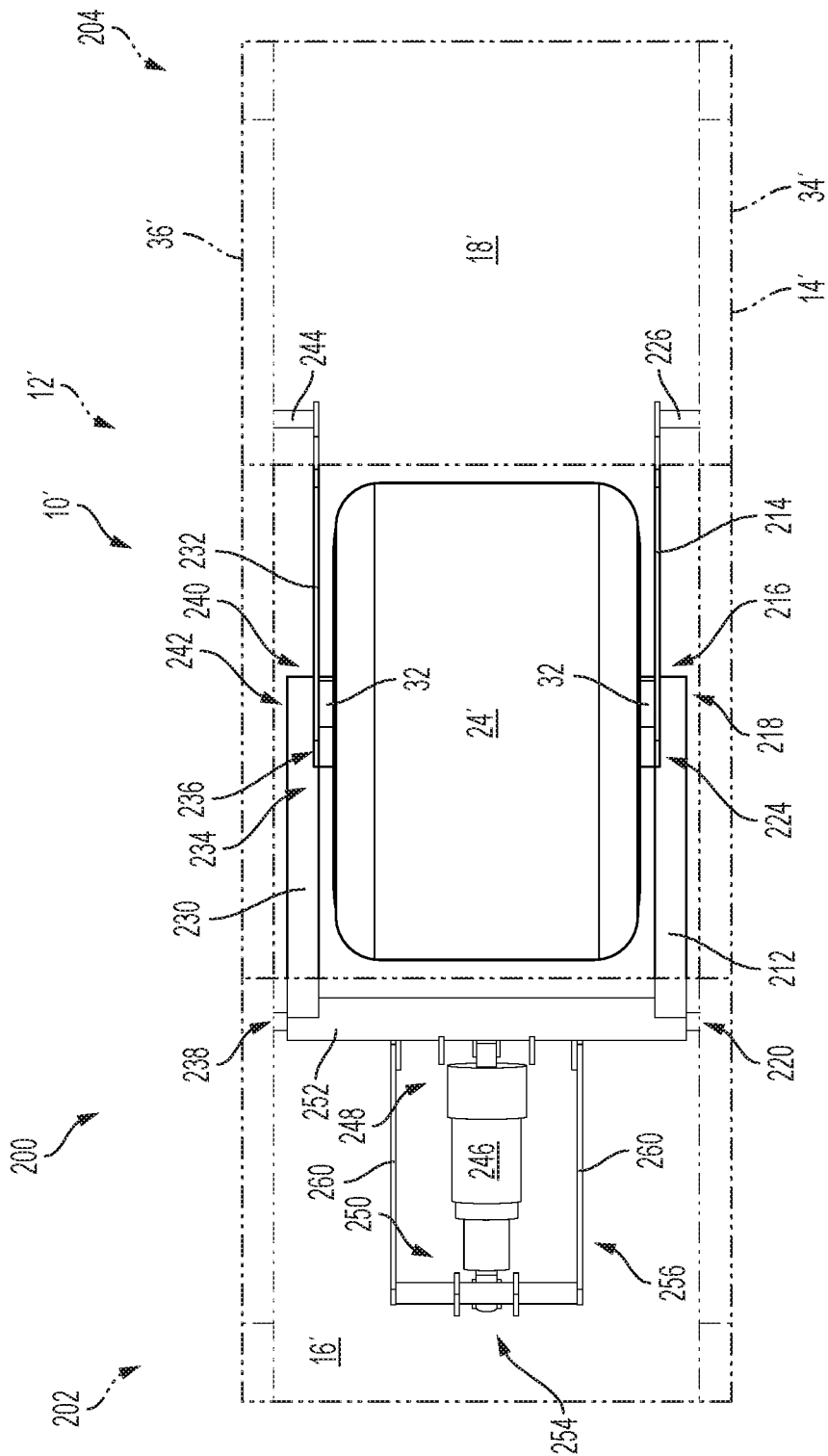
FIG. 10 is a top plan view of the vehicle of FIG. 9.
Figure 11:
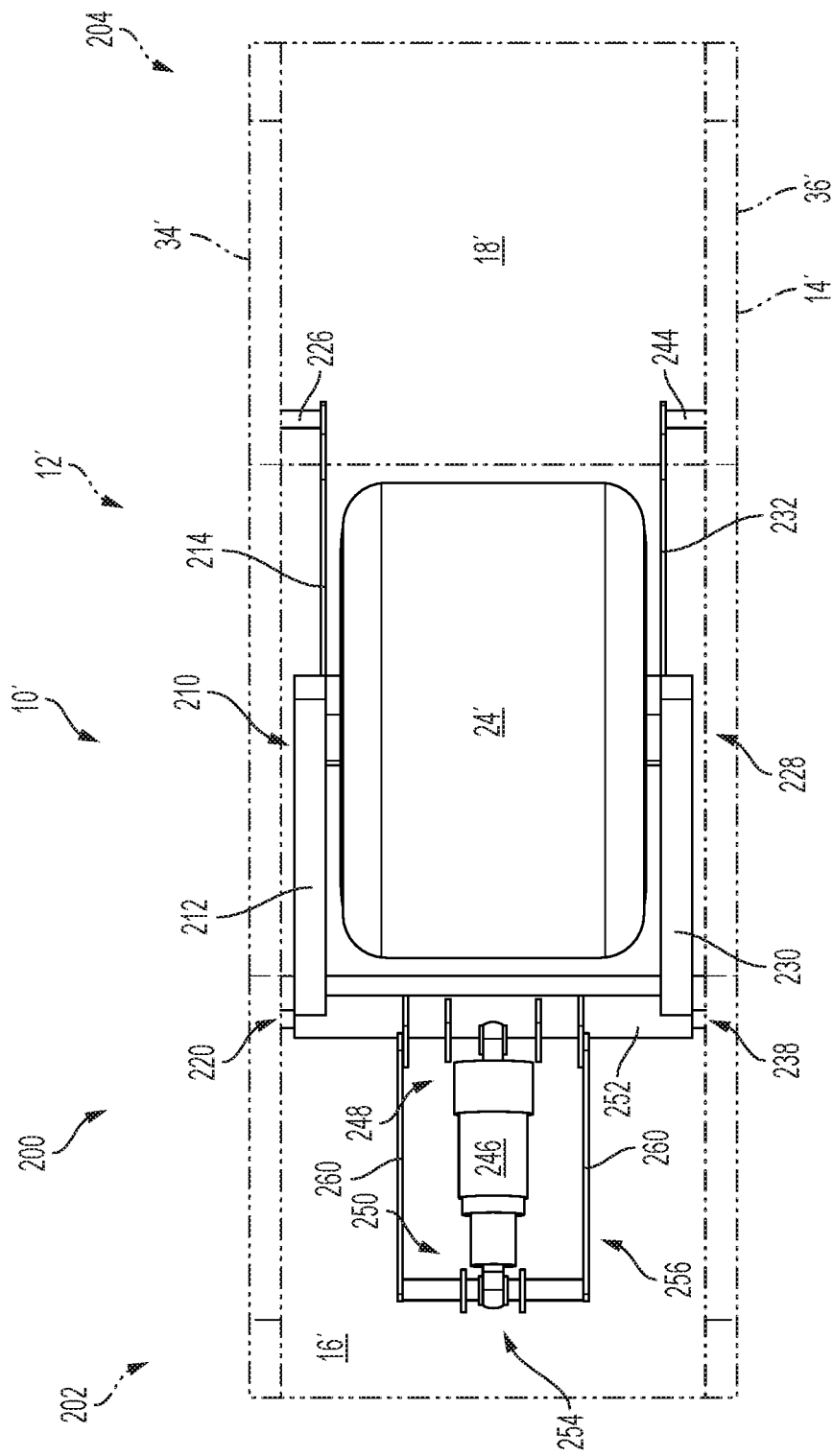
FIG. 11 is a bottom plan view of the vehicle of FIG. 9.
Figure 12:
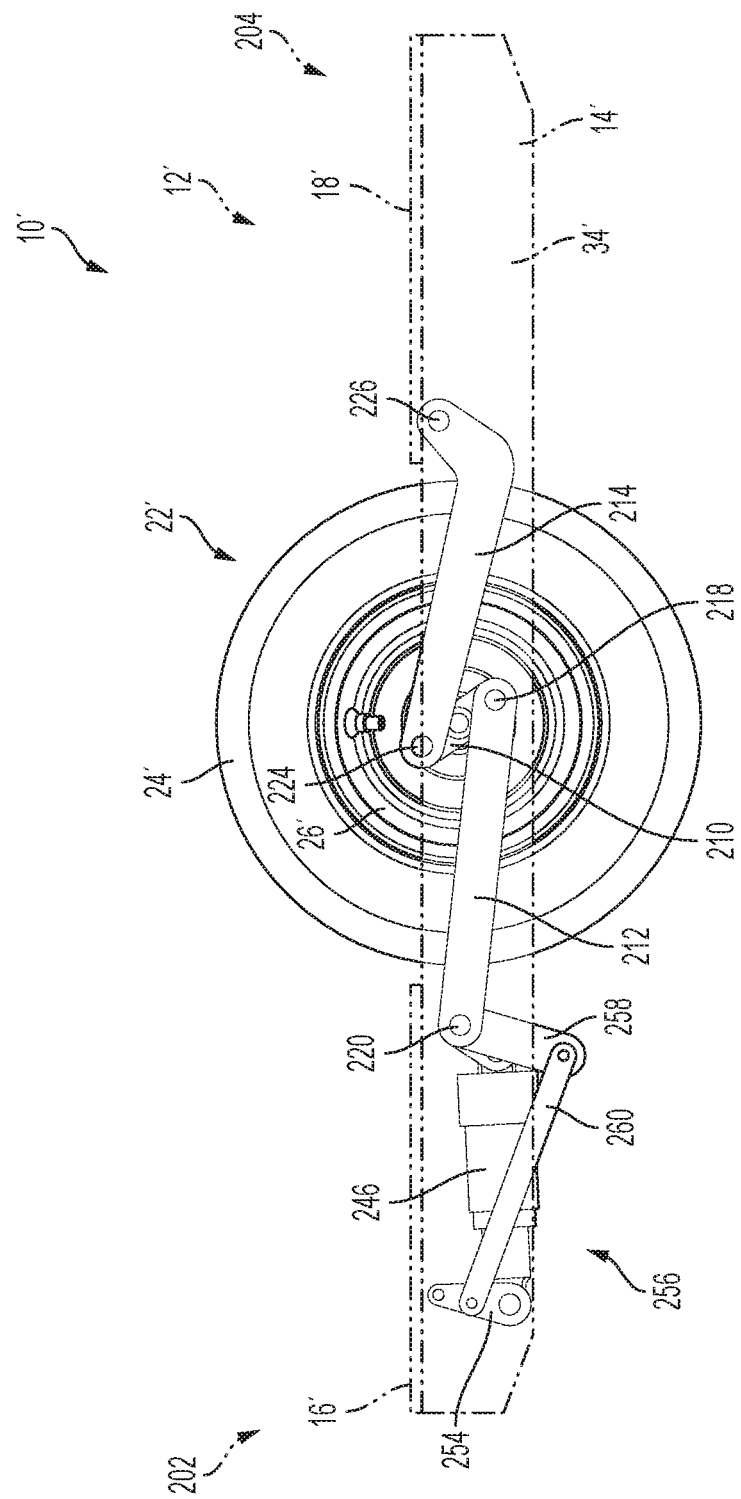
FIG. 12 is a side elevation view of the vehicle of FIG. 9.
Figure 13:
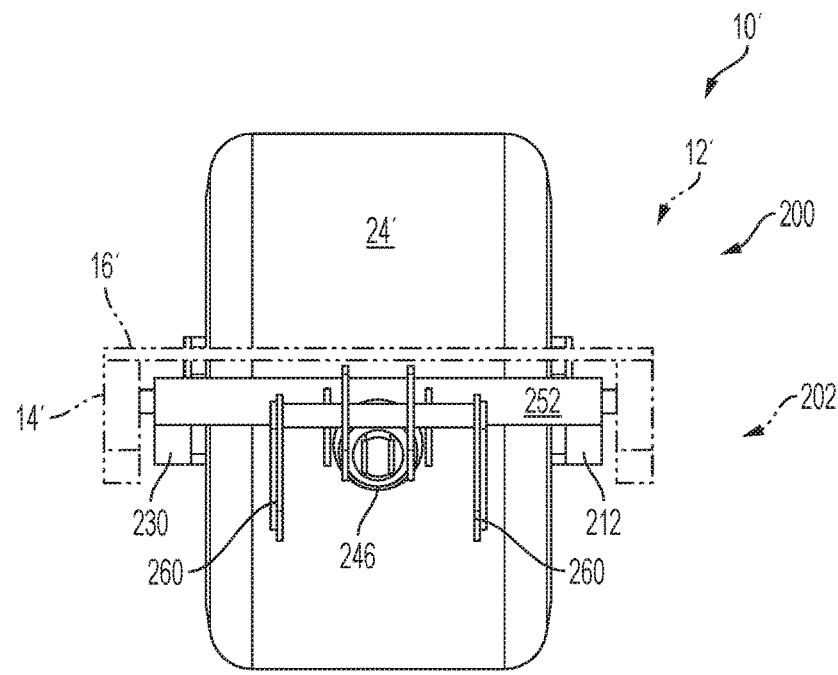
FIG. 13 is an end elevation view of the vehicle of FIG. 9, taken from a first end.
Figure 14:
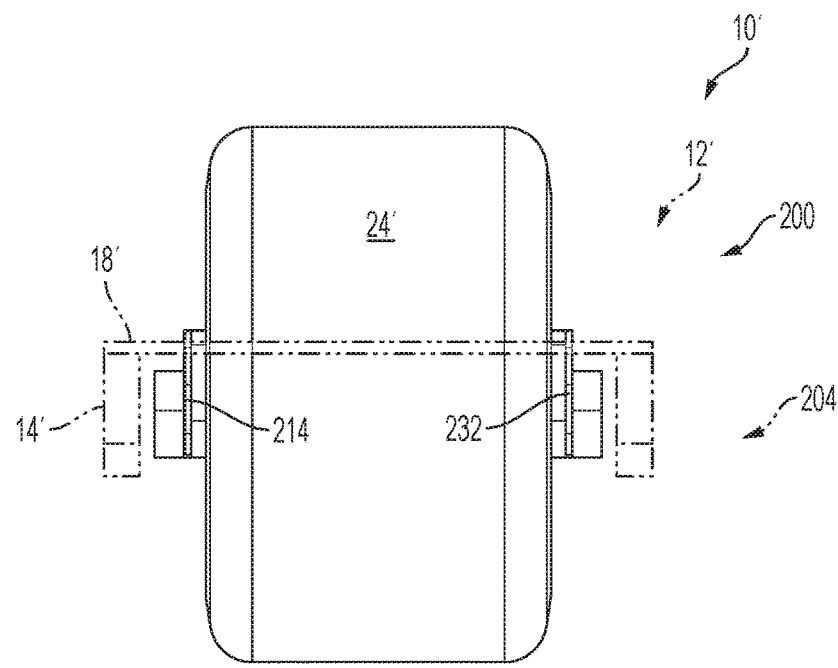
FIG. 14 is an end elevation view of the vehicle of FIG. 9, taken from a second end.
Figure 15:
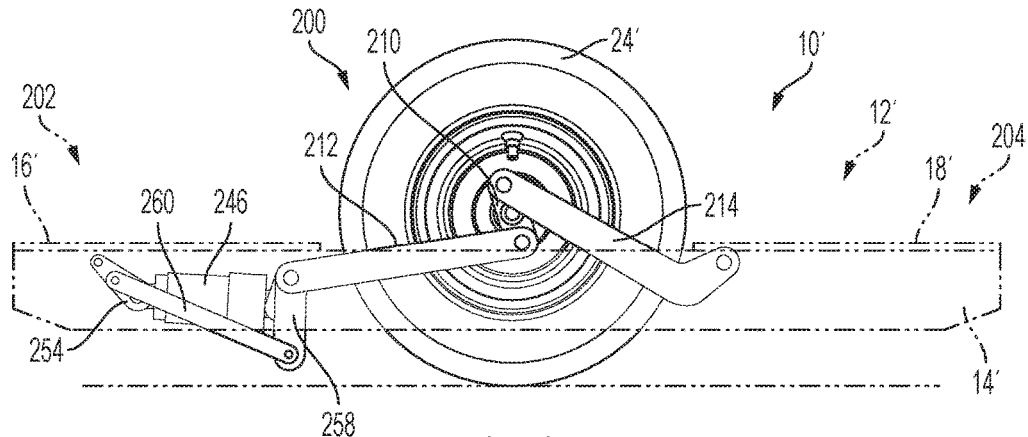
FIG. 15 is a side elevation view of the vehicle of FIG. 9 with the suspension system in a first configuration.
Figure 16:
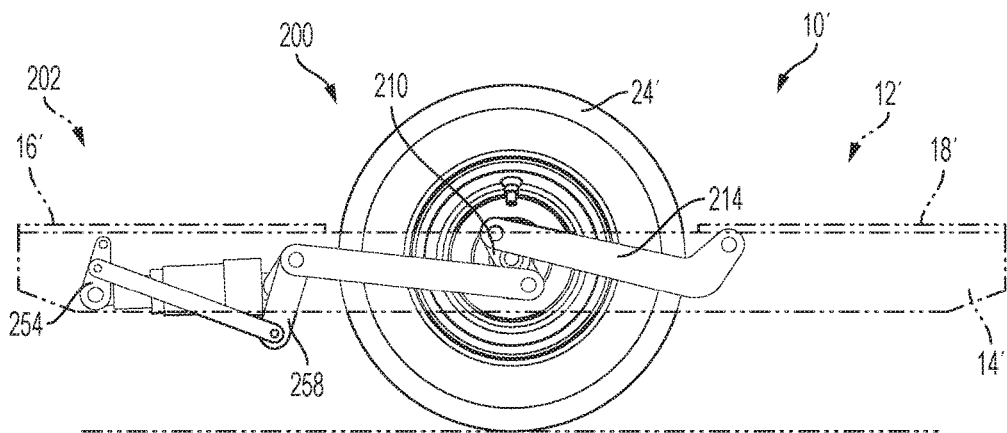
FIG. 16 is a side elevation view of the vehicle of FIG. 9 with the suspension system in a second configuration.
Figure 17:
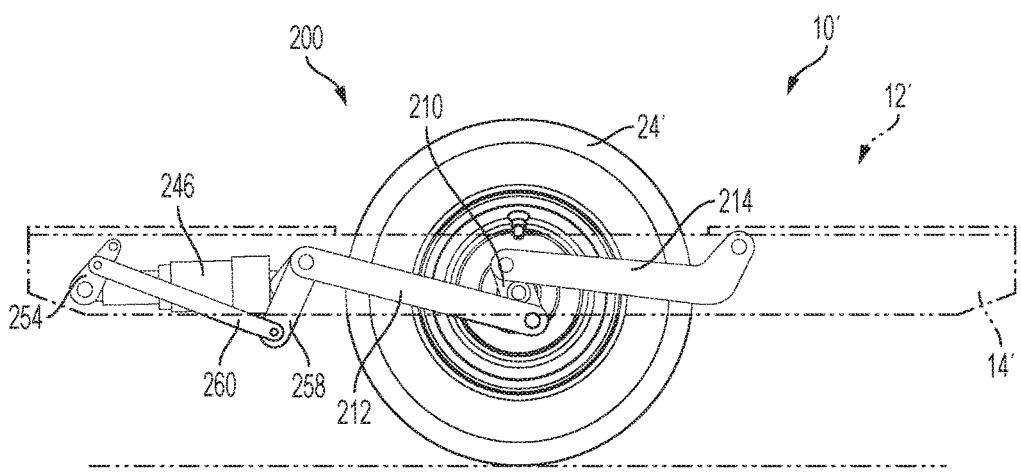
FIG. 17 is a side elevation view of the vehicle of FIG. 9 with the suspension system in a third configuration.

As shown in FIGS. 9-17, this section describes a second illustrative suspension system 200 incorporated into vehicle 10'. FIG. 9 is an isometric view of vehicle 10' and suspension system 200. FIG. 10 is a top plan view, FIG. 11 is a bottom plan view, and FIG. 12 is a side elevation view. FIGS. 13 and 14 are end elevation views. FIGS. 15-17 are side elevation views of the vehicle with the suspension system three different configurations.

As described above, vehicle 10' includes board 12' having frame 14'. First deck portion 16' is disposed at a first end portion 202 of the frame, and second deck portion 18' is disposed at a second end portion 204 of the frame. Wheel assembly 22' includes exactly one wheel (wheel 24') rotatable on axle 32', and the wheel is disposed between and extends above and below the first and second deck portions. Motor assembly 26' is configured to rotate the wheel about the axle to propel the vehicle, based on board orientation. As shown in FIGS. 9-17, frame 14' is coupled to wheel assembly 22' by only suspension system 200.

Suspension system 200 includes a pair of Watt's linkages 206, 208 connecting opposing end portions of axle 32' to frame 14'. Each of the Watt's linkages is substantially similar. Watt's linkage 206 includes a central link 210 coupled to one end of axle 32'. Linkage 206 further includes a first pivoting link 212 and a second pivoting link 214 connecting the central link to the frame. Specifically, first pivoting link 212 is coupled to a first end portion 216 of central link 210 at a first rotating joint 218 and coupled to first end portion 202 of the frame at a second rotating joint 220. And second pivoting link 214 is coupled to a second end portion 222 of the central link at a third rotating joint 224 and coupled to second end portion 204 of the frame at a fourth rotating joint 226. As depicted in the drawings, the second rotating joint and the fourth rotating joint are disposed below the deck portions of the board.

Similarly, Watt's linkage 208 includes a central link 228 coupled to the other end of axle 32'. Linkage 208 further includes a first pivoting link 230 and a second pivoting link 232 connecting the central link to the frame. Specifically, first pivoting link 230 is coupled to a first end portion 234 of central link 228 at a first rotating joint 236 and coupled to first end portion 202 of the frame at a second rotating joint 238. And second pivoting link 232 is coupled to a second end portion 240 of the central link at a third rotating joint 242 and coupled to second end portion 204 of the frame at a fourth rotating joint 244. Accordingly, the board is configured to be movable up and down on the Watt's linkages relative to the axle.

A shock absorber 246 has a first end 248 coupled to the pair of Watt's linkages and a second end 250 coupled to the board, such that the shock absorber is configured to damp movement of the board relative to the axle. Specifically, first end 248 of shock absorber 246 is coupled to a transverse frame member 252 joining the pair of Watt's linkages, and second end 250 of shock absorber 246 is coupled to the board by a rocker arm 254. The rocker arm is coupled to transverse member 252 by a linkage mechanism 256, such that movement of the Watt's linkages pivots rocker arm 254 relative to the board. Because the shock is connected to the rocker arm, pivoting of rocker arm 254 changes an effective length of shock absorber 246.

With specific reference to FIGS. 15-17, relative motion of board 12' with respect to axle 32' is depicted. In FIG. 15, board 12' is at a low position with respect to axle 32'. In FIG. 16, board 12' is at a mid-position with respect to axle 32'. In FIG. 16, board 12' is at a high position with respect to axle 32'. As shown in the drawings, the generally vertical movement of board 12' with respect to axle 32' results in the outer ends of the linkage arms (i.e., pivotable links 212 and 214) moving up and down while the central link rotates slightly. Pivoting of link 212 causes a pair of extension members 258, which extend orthogonally from transverse member 252, to pivot as well. Extension members 258 are coupled to rocker arm 254 by a pivoting link 260, such that pivoting of extension members 258 results in a corresponding pivoting of rocker arm 254 and alteration of the effective length of shock absorber 246. Linkage mechanism 256 comprises extension members 258 and pivoting link 260.

C. Third Illustrative Suspension System: Transverse Damper

Figure 18:
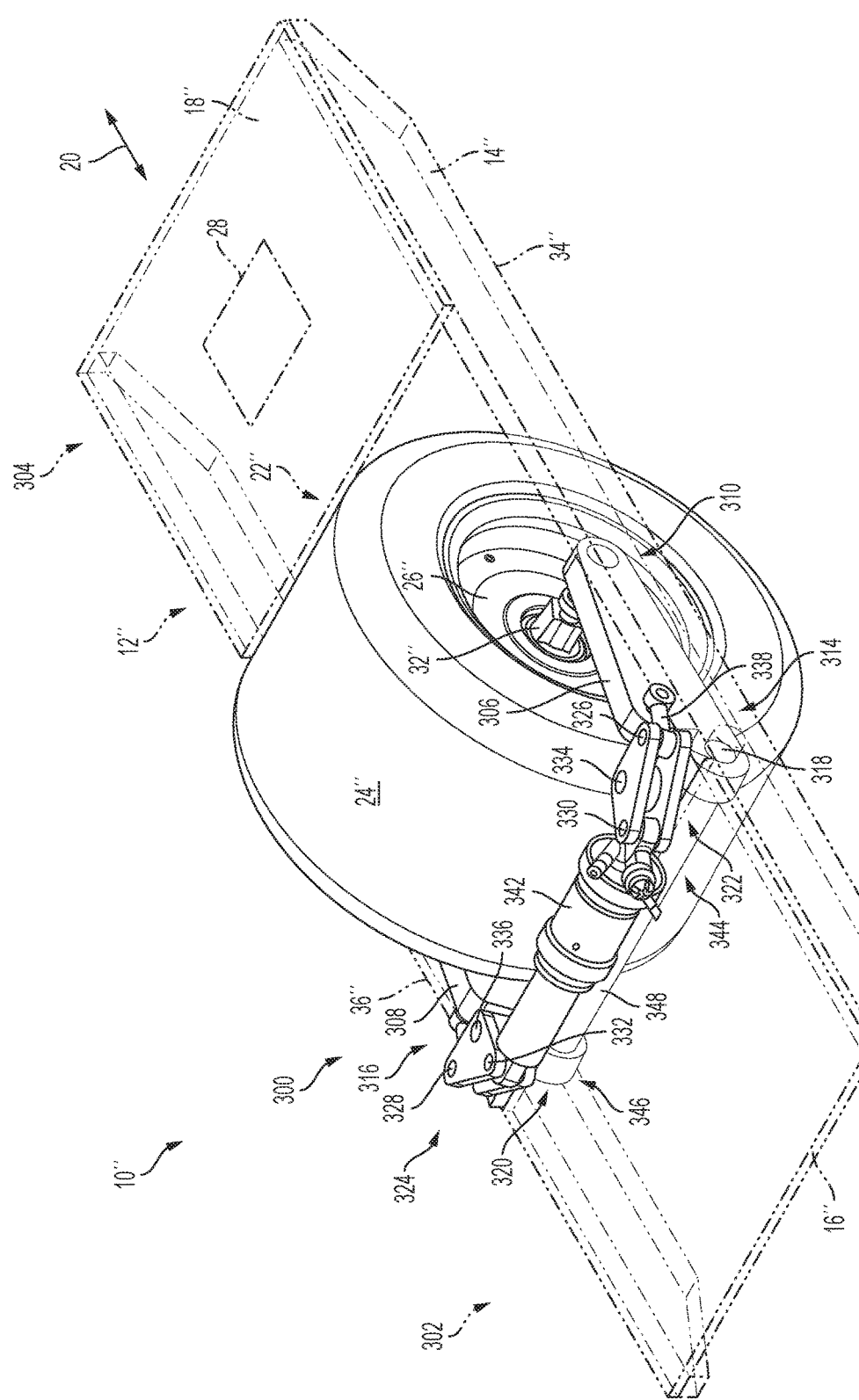
FIG. 18 is an isometric view of another illustrative one-wheeled electric vehicle having a third suspension system in accordance with aspects of the present disclosure
Figure 19:
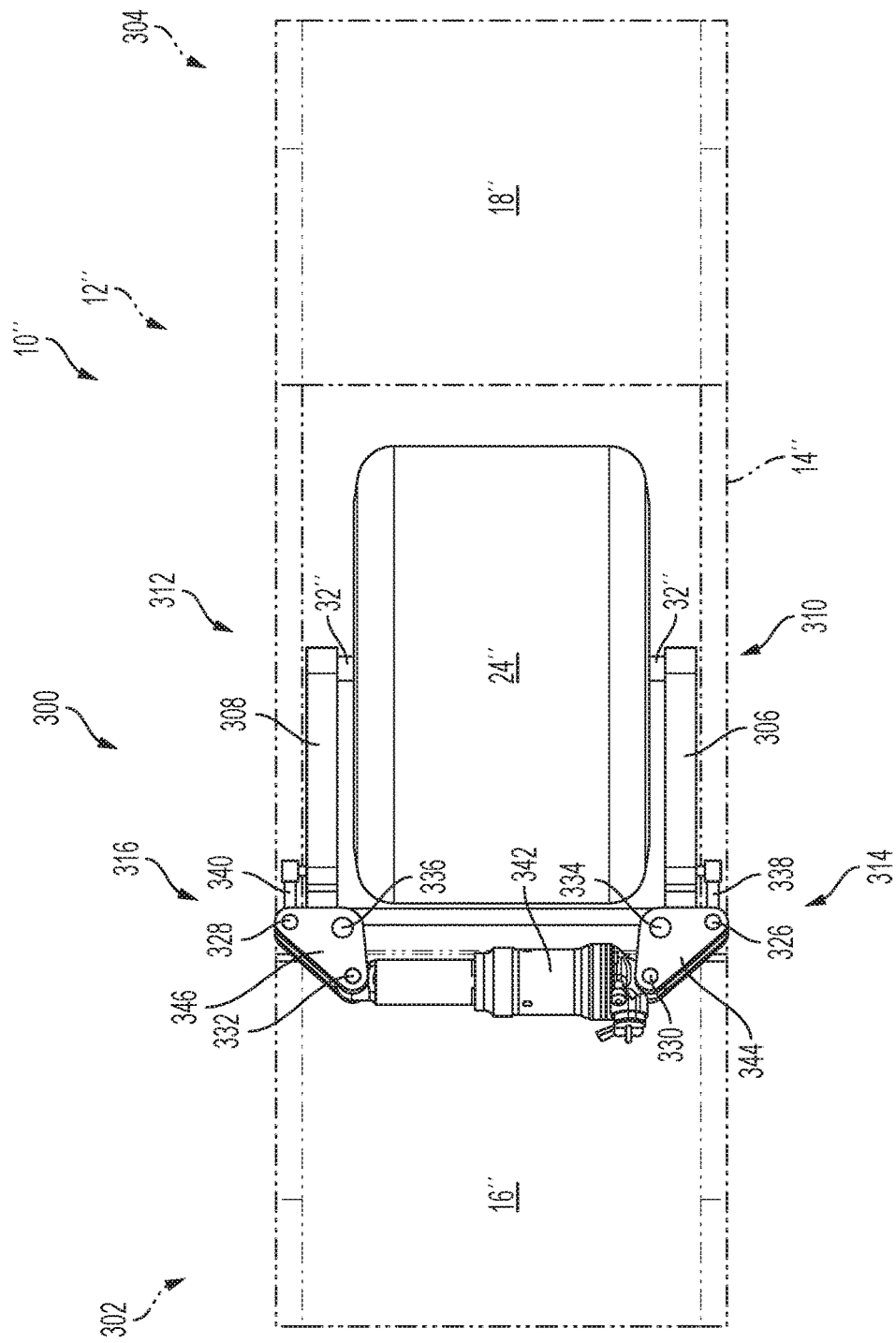
FIG. 19 is a top plan view of the vehicle of FIG. 18.
Figure 20:
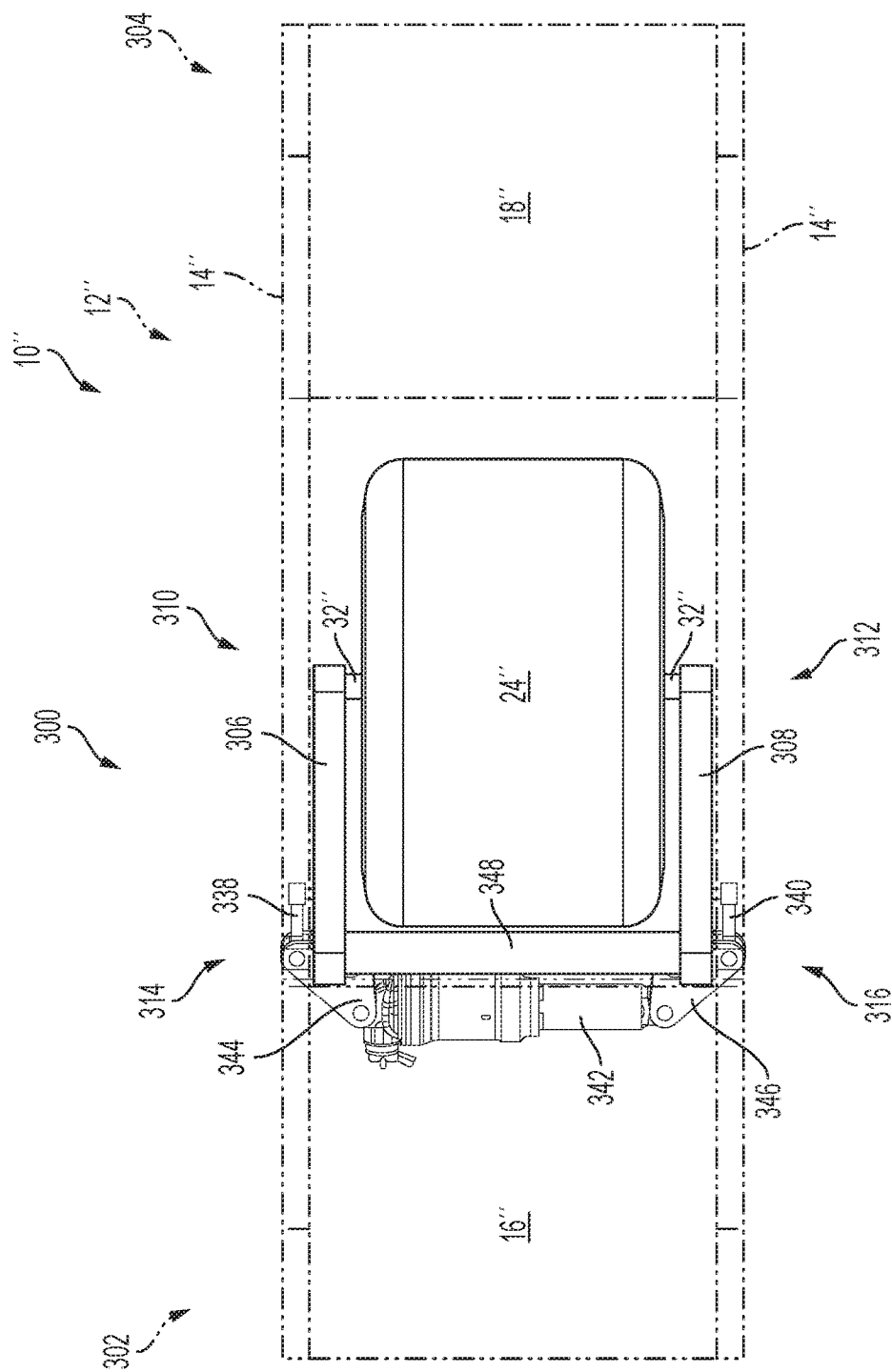
FIG. 20 is a bottom plan view of the vehicle of FIG. 18.
Figure 21:
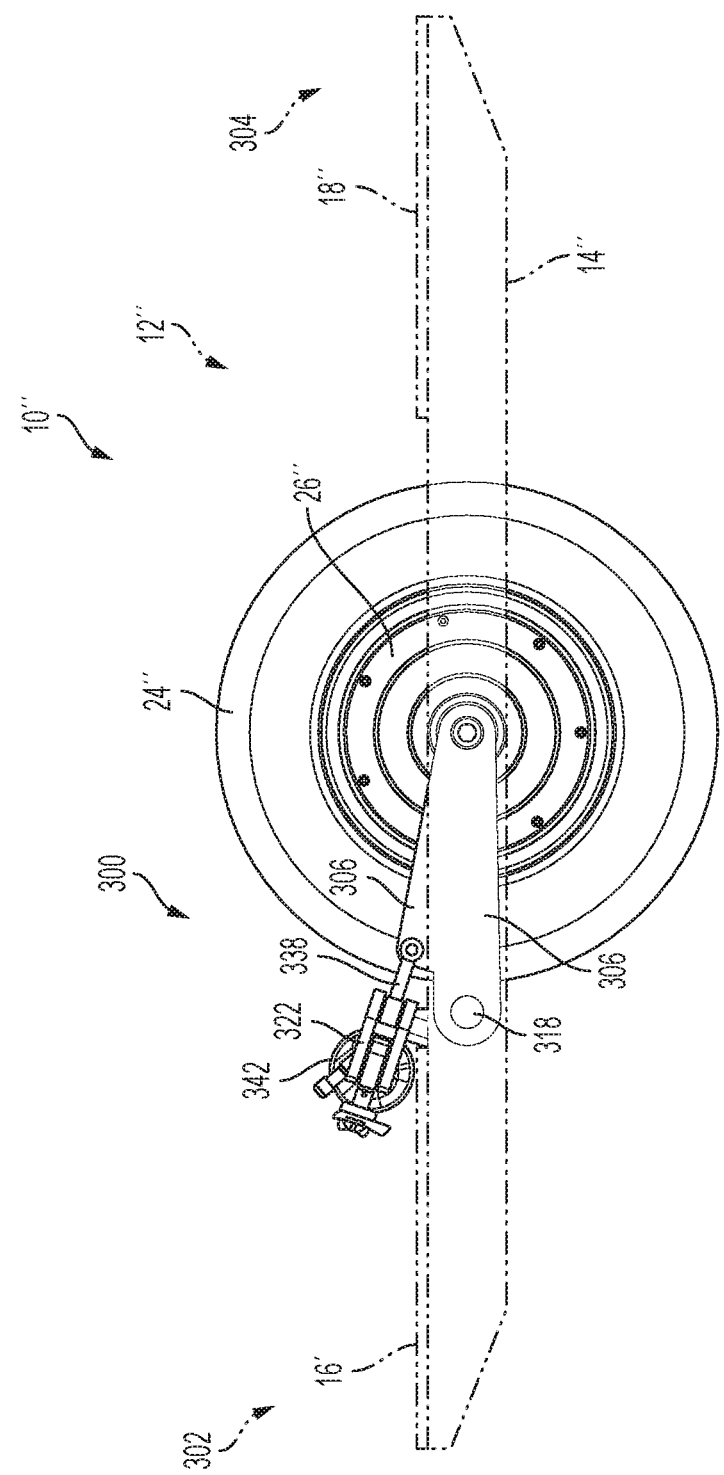
FIG. 21 is a side elevation view of the vehicle of FIG. 18.
Figure 22:
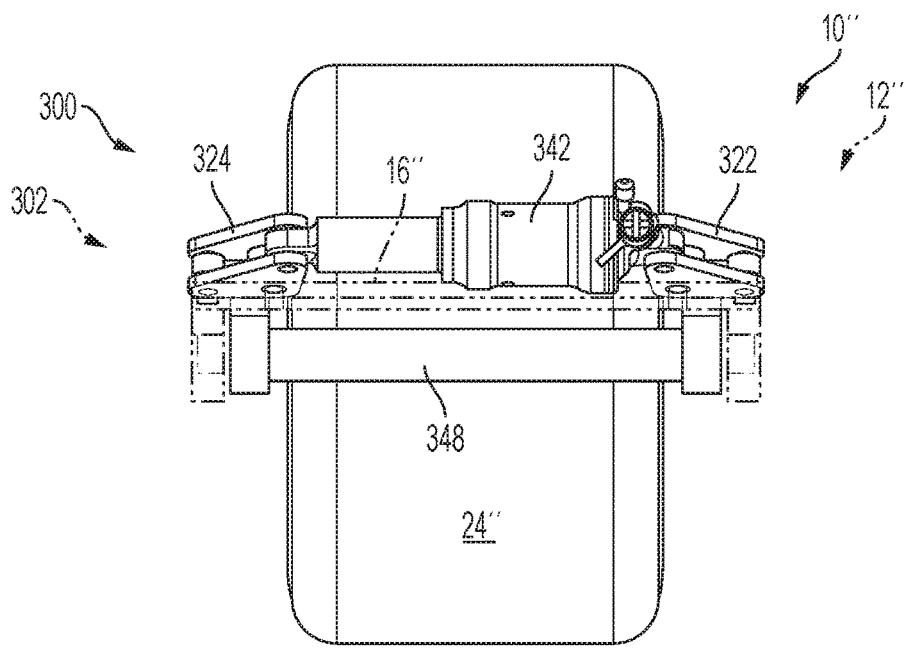
FIG. 22 is an end elevation view of the vehicle of FIG. 18, taken from a first end.
Figure 23:
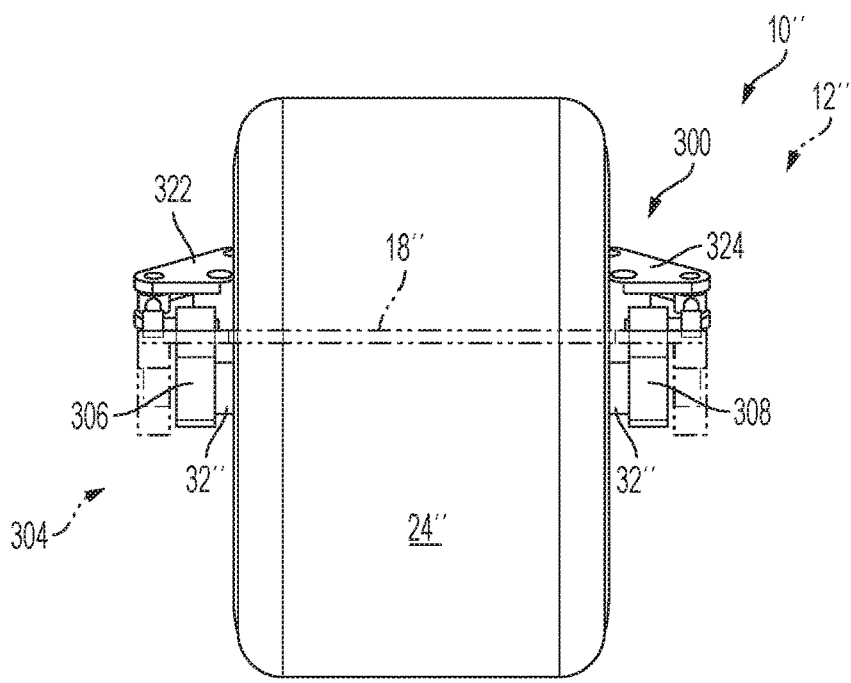
FIG. 23 is an end elevation view of the vehicle of FIG. 18, taken from a second end.
Figure 24:
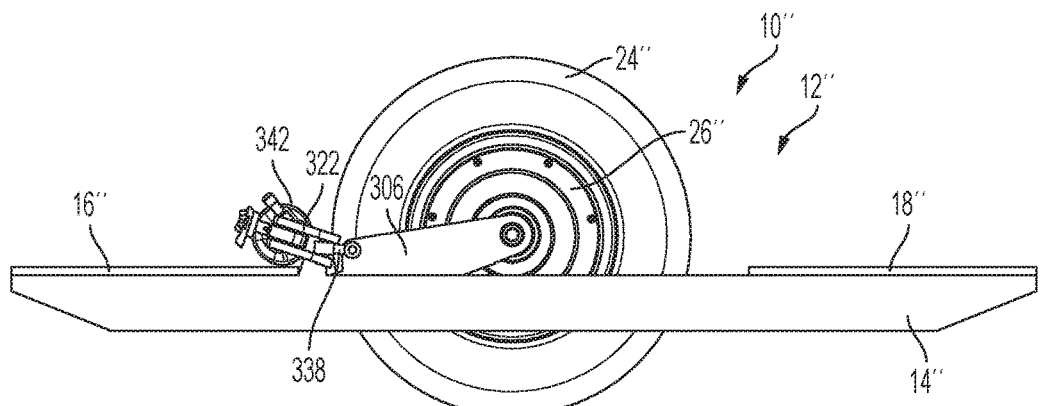
FIG. 24 is a side elevation view of the vehicle of FIG. 18 with the suspension system in a first configuration.
Figure 25:
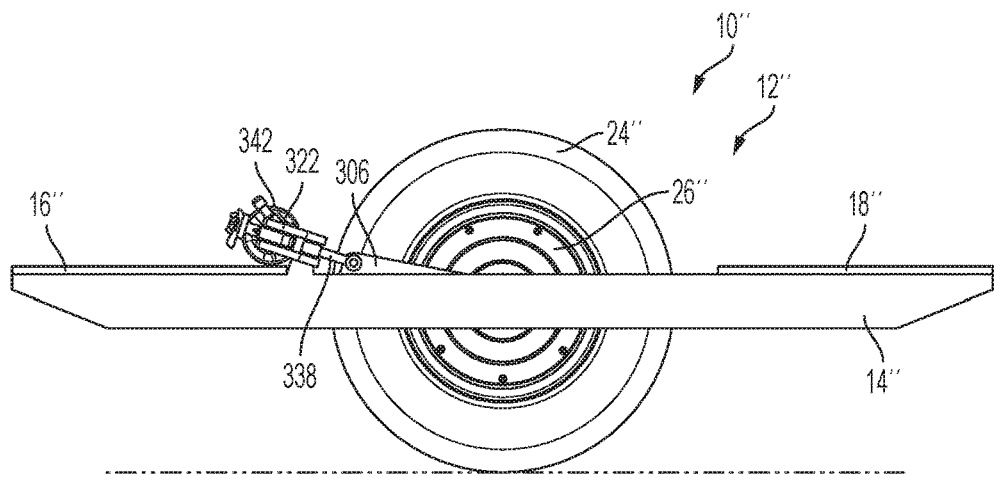
FIG. 25 is a side elevation view of the vehicle of FIG. 18 with the suspension system in a second configuration.
Figure 26:
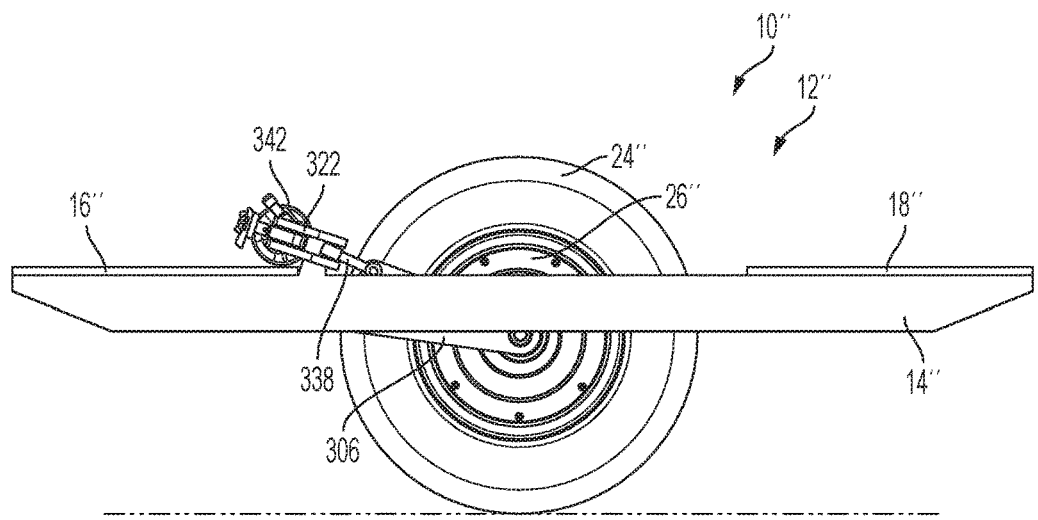
FIG. 26 is a side elevation view of the vehicle of FIG. 18 with the suspension system in a third configuration.
Figure 27:
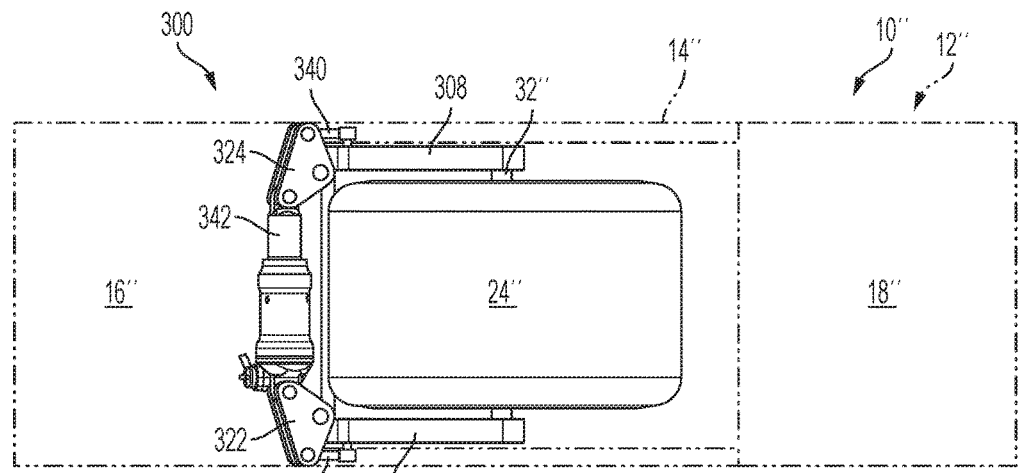
FIG. 27 is a top plan view of the vehicle of FIG. 18 with the suspension system in the first configuration.
Figure 28:
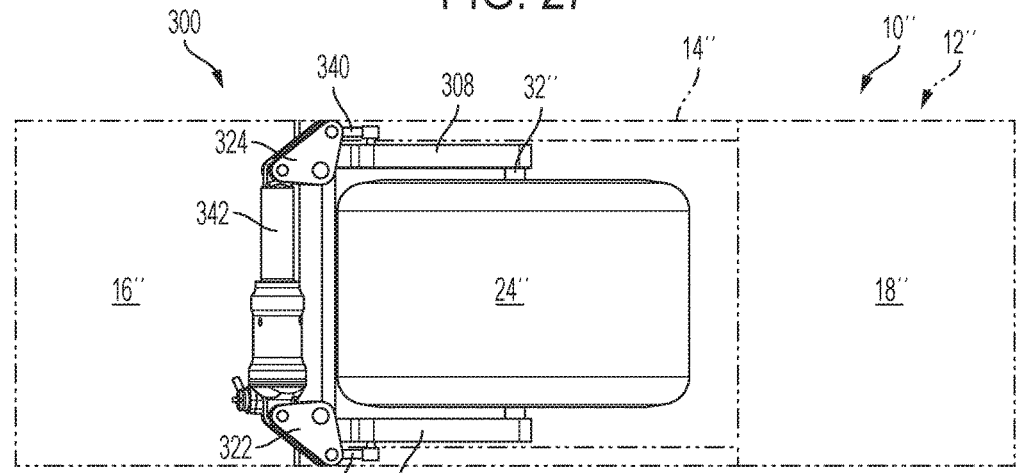
FIG. 28 is a top plan view of the vehicle of FIG. 18 with the suspension system in the second configuration.
Figure 29:
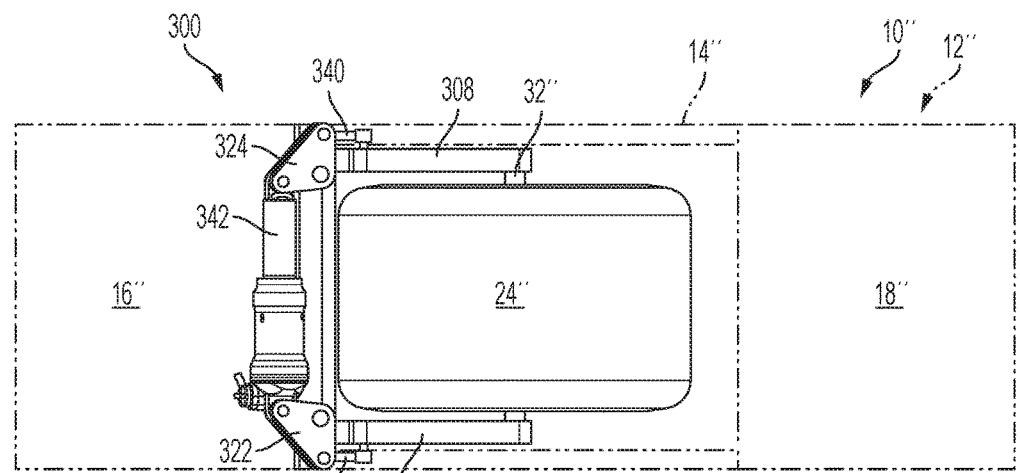
FIG. 29 is a top plan view of the vehicle of FIG. 18 with the suspension system in the third configuration.

As shown in FIGS. 18-29, this section describes a third illustrative suspension system 300 incorporated into vehicle 10″. FIG. 18 is an isometric view of vehicle 10″ and suspension system 300. FIG. 19 is a top plan view, FIG. 20 is a bottom plan view, and FIG. 21 is a side elevation view. FIGS. 22 and 23 are end elevation views. FIGS. 24-29 are side and top views of the vehicle with the suspension system three different configurations.

As described above, vehicle 10″ includes board 12″ having frame 14″. First deck portion 16″ is disposed at a first end portion 302 of the frame, and second deck portion 18″ is disposed at a second end portion 304 of the frame. Wheel assembly 22″ includes exactly one wheel (wheel 24″) rotatable on axle 32″, and the wheel is disposed between and extends above and below the first and second deck portions. Motor assembly 26″ is configured to rotate the wheel about the axle to propel the vehicle, based on board orientation.

Suspension system 300 couples the wheel assembly to the board, such that the board is configured to be movable up and down relative to the axle. The suspension system includes a first pivotable link 306 and a second pivotable link 308, each of which is coupled at a proximal end 310, 312 to a respective end portion of axle 32″ and coupled at a distal end 314, 316 to first end portion 302 of the frame by a distal rotating joint 318, 320. System 300 further includes a first bell crank 322 and a second bell crank 324 disposed above a plane defined by the first deck portion. Each of the bell cranks has a first moving pivot 326, 328 and a second moving pivot 330, 332. The two bell cranks are rotatably coupled to first end portion 302 by a fixed pivot 334, 336, and oppose each other across a width of board 12″.

A first pushrod 338 couples first pivotable link 306 to first moving pivot 326 of first bell crank 322, and a second pushrod 340 couples second pivotable link 308 to first moving pivot 328 of second bell crank 324. In some examples, such as the one shown in FIGS. 18-29, the pushrods may be coupled to the pivotable links and the bell cranks at rotating joints that have orthogonal axes of rotation. In other words, pushrods 338 and 340 may each have two degrees of freedom.

A transversely-oriented shock absorber 342 is configured to damp movement of the board relative to the axle. Accordingly, shock absorber 342 has a first end 344 coupled to second moving pivot 330 of the first bell crank and a second end 346 coupled to second moving pivot 332 of the second bell crank.

In some examples, vehicle 10″ further includes a transverse member 348 joining the distal ends of the first and second pivotable links. In this example, frame 14″ is coupled to the wheel assembly by only suspension system 300. Second end portion 304 of the frame is unconnected or free floating with respect to the suspension system.

D. Illustrative Electrical Controls

Figure 30:
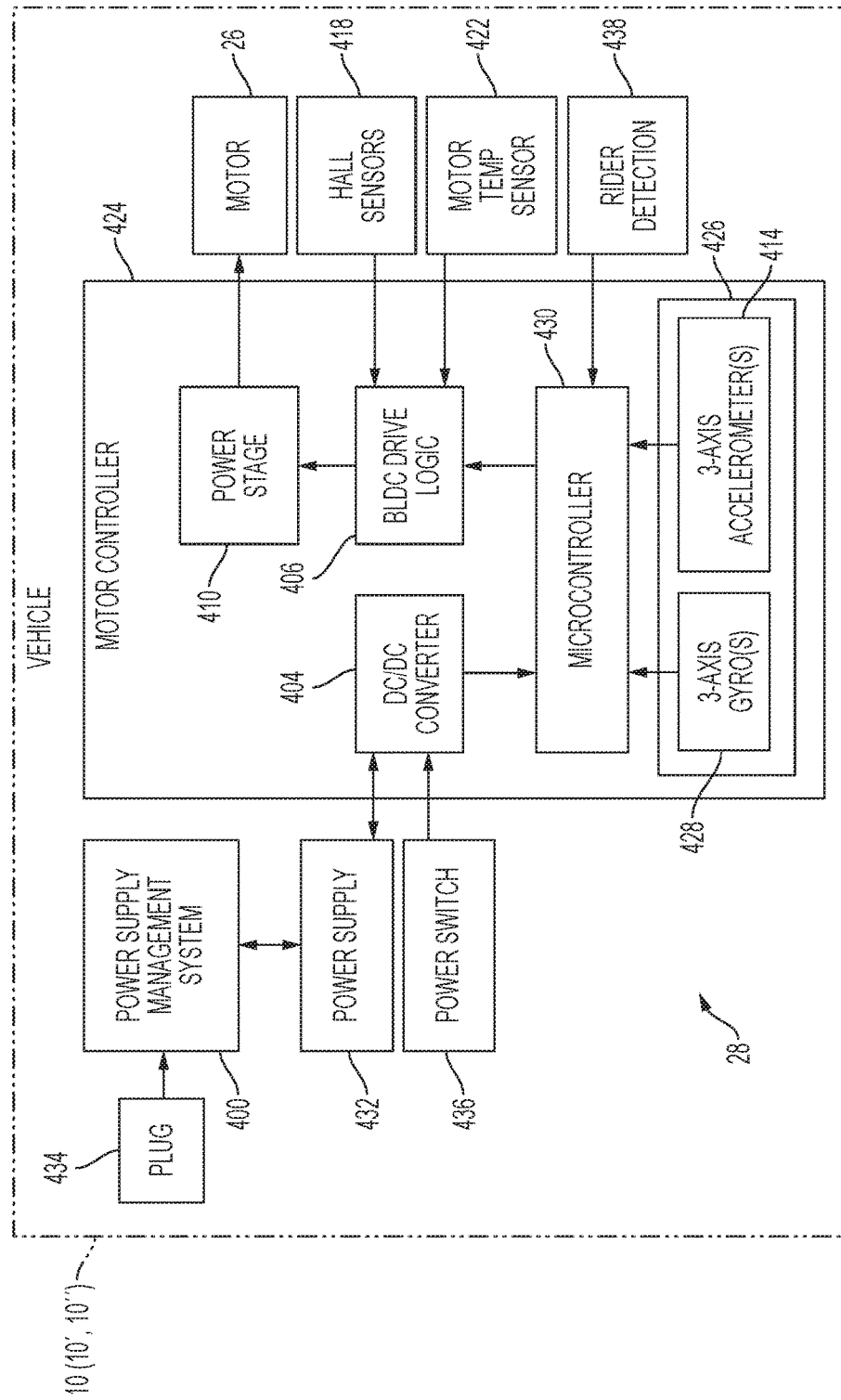
FIG. 30 is a block diagram of illustrative electrical and electronic components suitable for use with vehicles described herein.

FIG. 30 shows a block diagram of system 28, described briefly above, comprising various illustrative electrical components of vehicle 10, 10', or 10″, including onboard controls, some or all of which may be included in the vehicle. The electrical components may include a power supply management system 400, a direct current to direct current (DC/DC) converter 404, a brushless direct current (BLDC) drive logic 406, a power stage 410, one or more 3-axis accelerometers 414, one or more hall sensors 418, and/or a motor temperature sensor 422. DC/DC converter 404, BLDC drive logic 406, and power stage 410 may be included in and/or connected to a motor controller 424. Accelerometer(s) 414 may be included in the one or more orientation or tilt sensors 426 mentioned above.

Active balancing (or self-stabilization) of the electric vehicle may be achieved through the use of a feedback control loop or mechanism. The feedback control mechanism may include sensors 426, which may be electrically coupled to and/or included in motor controller 424. Preferably, the feedback control mechanism includes a Proportional-Integral-Derivative (PID) control scheme using one or more gyros 428 and one or more accelerometers (e.g., accelerometer(s) 414). Gyro 428 may be configured to measure a pivoting of the board about its pitch axis (also referred to as the fulcral axis). Gyro 428 and accelerometer 414 may be collectively configured to estimate (or measure, or sense) a lean angle of board 12, such as an orientation of the foot deck about the pitch, roll and/or yaw axes. In some embodiments, the gyro and accelerometer 414 may be collectively configured to sense orientation information sufficient to estimate the lean angle of frame 14, including pivotation about the pitch, roll and/or yaw axes.

As mentioned above, orientation information of board 12 may be measured (or sensed) by gyro 428 and accelerometer 414. The respective measurements (or sense signals) from gyro 428 and accelerometer 414 may be combined using a complementary or Kalman filter to estimate a lean angle of board 12 (e.g., pivoting of board 12 about the pitch, roll, and/or yaw axes, with pivoting about the pitch axis corresponding to a pitch angle, pivoting about the roll axis corresponding to a roll or heel-toe angle, and pivoting about the yaw axis corresponding to a side-to-side yaw angle) while filtering out the impacts of bumps, road texture and disturbances due to steering inputs. For example, gyro 428 and accelerometer 414 may be connected to microcontroller 430, which may be configured to correspondingly measure movement of board 12 about and along the pitch, roll, and/or yaw axes.

Alternatively, the electronic vehicle may include any suitable sensor and feedback control loop configured to self-stabilize a vehicle, such as a 1-axis gyro configured to measure pivotation of the board about the pitch axis, a 1-axis accelerometer configured to measure a gravity vector, and/or any other suitable feedback control loop, such as a closed-loop transfer function. Additional accelerometer and gyro axes may allow improved performance and functionality, such as detecting if the board has rolled over on its side or if the rider is making a turn.

The feedback control loop may be configured to drive motor 26 to reduce an angle of board 12 with respect to the ground. For example, if a rider were to angle board 12 downward, so that first deck portion 16 was 'lower' than second deck portion 18 (e.g., if the rider pivoted board 12 counterclockwise (CCW) in FIG. 1), then the feedback loop may drive motor 26 to cause CCW rotation of tire 24 about the pitch axis (i.e., axle 36) and a clockwise force on board 12.

Thus, motion of the electric vehicle may be achieved by the rider leaning his or her weight toward a selected (e.g., "front") foot. Similarly, deceleration may be achieved by the rider leaning toward the other (e.g., "back" foot). Regenerative braking can be used to slow the vehicle. Sustained operation may be achieved in either direction by the rider maintaining their lean toward either selected foot.

As indicated in FIG. 30, microcontroller 430 may be configured to send a signal to brushless DC (BLDC) drive logic 406, which may communicate information relating to the orientation and motion of board 12. BLDC drive logic 406 may then interpret the signal and communicate with power stage 410 to drive motor 26 accordingly. Hall sensors 418 may send a signal to the BLDC drive logic to provide feedback regarding a substantially instantaneous rotational rate of the rotor of motor 26. Motor temperature sensor 422 may be configured to measure a temperature of motor 26 and send this measured temperature to logic 406. Logic 406 may limit an amount of power supplied to motor 26 based on the measured temperature of motor 26 to prevent the motor from overheating.

Certain modifications to the PID loop or other suitable feedback control loop may be incorporated to improve performance and safety of the electric vehicle. For example, integral windup may be prevented by limiting a maximum integrator value, and an exponential function may be applied to a pitch error angle (e.g., a measure or estimated pitch angle of board 12).

Alternatively or additionally, some embodiments may include neural network control, fuzzy control, genetic algorithm control, linear quadratic regulator control, state-dependent Riccati equation control, and/or other control algorithms. In some embodiments, absolute or relative encoders may be incorporated to provide feedback on motor position.

During turning, the pitch angle can be modulated by the heel-toe angle (e.g., pivoting of the board about the roll axis), which may improve performance and prevent a front inside edge of board 12 from touching the ground. In some embodiments, the feedback loop may be configured to increase, decrease, or otherwise modulate the rotational rate of the tire if the board is pivoted about the roll and/or yaw axes. This modulation of the rotational rate of the tire may exert an increased normal force between a portion of the board and the rider, and may provide the rider with a sense of "carving" when turning, similar to the feel of carving a snowboard through snow or a surfboard through water.

Once the rider has suitably positioned themselves on the board, the control loop may be configured to not activate until the rider moves the board to a predetermined orientation. For example, an algorithm may be incorporated into the feedback control loop, such that the control loop is not active (e.g., does not drive the motor) until the rider uses their weight to bring the board up to an approximately level orientation (e.g., 0 degree pitch angle). Once this predetermined orientation is detected, the feedback control loop may be enabled (or activated) to balance the electric vehicle and to facilitate a transition of the electric vehicle from a stationary mode (or configuration, or state, or orientation) to a moving mode (or configuration, or state, or orientation).

With continued reference to FIG. 30, the various electrical components may be configured to manage a power supply 432. For example, power supply management system 400 may be a battery management system configured to protect batteries of power supply 432 from being overcharged, over-discharged, and/or short-circuited. System 400 may monitor battery health, may monitor a state of charge in power supply 432, and/or may increase the safety of the vehicle. Power supply management system 400 may be connected between a charge plug 434 of vehicle 10 and power supply 432. The rider (or other user) may couple a charger to plug 434 and re-charge power supply 432 via system 400.

In operation, power switch 436 may be activated (e.g., by the rider). Activation of switch 436 may send a power-on signal to converter 404. In response to the power-on signal, converter 404 may convert direct current from a first voltage level provided by power supply 432 to one or more other voltage levels. The other voltage levels may be different than the first voltage level. Converter 404 may be connected to the other electrical components via one or more electrical connections to provide these electrical components with suitable voltages.

Converter 404 (or other suitable circuitry) may transmit the power-on signal to microcontroller 430. In response to the power-on signal, microcontroller may initialize sensors 426, and a rider detection device 438.

The electric vehicle may include one or more safety mechanisms, such as power switch 438 and/or rider detection device 438 to ensure that the rider is on the board before engaging the feedback control loop. In some embodiments, rider detection device 438 may be configured to determine if the rider's feet are disposed on the foot deck, and to send a signal causing motor 26 to enter an active state when the rider's feet are determined to be disposed on the foot deck.

Rider detection device 438 may include any suitable mechanism, structure, or apparatus for determining whether the rider is on the electric vehicle. For example, device 438 may include one or more mechanical buttons, one or more capacitive sensors, one or more inductive sensors, one or more optical switches, one or more force resistive sensors, and/or one or more strain gauges. Rider detection device 438 may be located on or under either or both of first and second deck portions 16, 18. In some examples, the one or more mechanical buttons or other devices may be pressed directly (e.g., if on the deck portions), or indirectly (e.g., if under the deck portions), to sense whether the rider is on board 12. In some examples, the one or more capacitive sensors and/or the one or more inductive sensors may be located on or near a surface of either or both of the deck portions, and may correspondingly detect whether the rider is on the board via a change in capacitance or a change in inductance. In some examples, the one or more optical switches may be located on or near the surface of either or both of the deck portions. The one or more optical switches may detect whether the rider is on the board based on an optical signal. In some examples, the one or more strain gauges may be configured to measure board or axle flex imparted by the rider's feet to detect whether the rider is on the board. In some embodiments, device 438 may include a hand-held "dead-man" switch.

If device 438 detects that the rider is suitably positioned on the electric vehicle, then device 438 may send a rider-present signal to microcontroller 430. The rider-present signal may be the signal causing motor 26 to enter the active state. In response to the rider-present signal (and/or, for example, the board being moved to the level orientation), microcontroller 430 may activate the feedback control loop for driving motor 26. For example, in response to the rider-present signal, microcontroller 430 may send board orientation information (or measurement data) from sensors 426 to logic 406 for powering motor 26 via power stage 410.

In some embodiments, if device 438 detects that the rider is no longer suitably positioned or present on the electric vehicle, device 438 may send a rider-not-present signal to microcontroller 430. In response to the rider-not-present signal, circuitry of vehicle 10 (e.g., microcontroller 430, logic 406, and/or power stage 410) may be configured to reduce a rotational rate of the rotor relative to the stator to bring vehicle 10 to a stop. For example, the electric coils of the rotor may be selectively powered to reduce the rotational rate of the rotor. In some embodiments, in response to the rider-not-present signal, the circuitry may be configured to energize the electric coils with a relatively strong and/or substantially continuously constant voltage, to lock the rotor relative to the stator, to prevent the rotor from rotating relative to the stator, and/or to bring the rotor to a sudden stop.

In some embodiments, the vehicle may be configured to actively drive motor 26 even though the rider may not be present on the vehicle (e.g., temporarily), which may allow the rider to perform various tricks. For example, device 438 may be configured to delay sending the rider-not-present signal to the microcontroller for a predetermined duration of time, and/or the microcontroller may be configured to delay sending the signal to logic 406 to cut power to the motor for a predetermined duration of time.

E. Additional Examples and Illustrative Combinations

This section describes additional aspects and features of illustrative suspension systems for one-wheeled electric vehicles, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A self-balancing electric vehicle, comprising:
a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
a wheel assembly including exactly one wheel rotatable on an axle, wherein the wheel is disposed between and extends above and below the first and second deck portions;
a motor assembly configured to rotate the wheel about the axle to propel the vehicle;
at least one sensor configured to measure an orientation of the board;
a motor controller configured to receive board orientation information measured by the at least one sensor and to cause the motor assembly to propel the vehicle based on the board orientation information;
a suspension system including a pair of four-bar linkages coupling opposing end portions of the axle to the first end portion of the frame, each of the four-bar linkages having a first fixed link connected to the axle, a second fixed link comprising the frame, and two pivotable links joining the first fixed link to the second fixed link, such that the board is configured to be movable up and down relative to the axle; and
a shock absorber having a first end coupled to the pair of four-bar linkages and a second end coupled to the first end portion of the frame, such that the shock absorber is configured to damp up and down movement of the board relative to the axle.

A1. The vehicle of A0, wherein each of the four-bar linkages comprises a double-rocker four-bar linkage.

A2. The vehicle of any one of paragraphs A0 through A1, wherein each of the pivotable links is coupled to the first fixed link by a first rotating joint and coupled to the frame by a second rotating joint.

A3. The vehicle of A2, wherein, for each of the four-bar linkages, the second rotating joints of the pivotable links are closer together than the first rotatable joints.

A4. The vehicle of any one of paragraphs A0 through A3, further comprising a transverse member extending across the frame generally perpendicular to the direction of travel, the transverse member connecting an opposing pair of the pivotable links of the four-bar linkages.

A5. The vehicle of A4, wherein the transverse member is configured to rotate as the board moves up and down relative to the axle.

A6. The vehicle of A4, wherein the first end of the shock absorber is coupled to the transverse member.

A7. The vehicle of any one of paragraphs A0 through A6, wherein the frame is coupled to the wheel assembly by only the suspension system.

A8. The vehicle of A7, wherein the second end portion of the frame is unconnected with respect to the suspension system.

B0. A self-balancing electric vehicle, comprising:
a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
a wheel assembly including exactly one wheel rotatable on an axle, wherein the board is tiltable about a fulcral axis defined by the axle and the wheel is disposed between and extends above and below the first and second deck portions;
a motor assembly configured to rotate the wheel about the axle to propel the vehicle;
at least one sensor configured to measure a tilting orientation of the board;
a motor controller configured to receive tilting orientation information measured by the at least one sensor and to cause the motor assembly to propel the vehicle based on the tilting orientation information;
a suspension system including a four-bar linkage coupling an end portion of the axle to the first end portion of the frame, the four-bar linkage having a first fixed link connected to the axle, a second fixed link comprising the frame, and two pivotable links joining the first fixed link to the second fixed link, such that the board is configured to move generally vertically relative to the axle; and
a shock absorber having a first end coupled to the four-bar linkage and a second end coupled to the first end portion of the frame, such that the shock absorber is configured to damp generally vertical movement of the board relative to the axle.

B1. The vehicle of B0, wherein each of the pivotable links is coupled to the first fixed link by a first rotating joint and coupled to the frame by a second rotating joint.

B2. The vehicle of B1, wherein the second rotating joints of the pivotable links are closer together than the first rotatable joints.

B3. The vehicle of any one of paragraphs B0 through B2, wherein the frame is coupled to the wheel assembly by only the suspension system.

B4. The vehicle of B3, wherein the second end portion of the frame is unconnected with respect to the suspension system.

C0. A method of reducing the impact of uneven terrain on an electric vehicle, the method comprising:
propelling a one-wheeled vehicle using a motor assembly of the vehicle to rotate a wheel about an axle oriented generally perpendicular to a direction of travel of the vehicle, the vehicle comprising a board tiltable about a fulcral axis defined by the axle, a first deck portion disposed at a first end portion of a frame of the board, and a second deck portion disposed at a second end portion of the frame of the board, such that the wheel is disposed between and extends above and below the first and second deck portions, wherein the first and second deck portions are each configured to receive a left or right foot of a rider oriented generally parallel to the fulcral axis;

causing the motor assembly to propel the vehicle based on board tilt information determined by an onboard tilt sensor;

in response to the wheel encountering an uneven support surface while being propelled, allowing generally vertical movement of the board relative to the axle using a suspension system, wherein the suspension system includes a four-bar linkage coupling an end portion of the axle to the first end portion of the frame, the four-bar linkage having a first fixed link connected to the axle, a second fixed link comprising the frame, and two pivotable links joining the first fixed link to the second fixed link; and damping the generally vertical movement of the board relative to the axle using a shock absorber having a first end coupled to the four-bar linkage and a second end coupled to the first end portion of the frame.

C1. The method of C0, wherein each of the pivotable links is coupled to the first fixed link by a first rotating joint and coupled to the frame by a second rotating joint.

C2. The method of C1, wherein the second rotating joints of the pivotable links are closer together than the first rotatable joints.

C3. The method of any one of paragraphs C0 through C2, wherein the frame is coupled to the wheel by only the suspension system.

C4. The method of C3, wherein the second end portion of the frame is unconnected with respect to the suspension system.

C5. The method of any one of paragraphs C0 through C4, wherein the motor assembly comprises a hub motor.

D0. A self-balancing electric vehicle, comprising:
  a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
  a wheel assembly including exactly one wheel rotatable on an axle, wherein the wheel is disposed between and extends above and below the first and second deck portions;
  a motor assembly configured to rotate the wheel about the axle to propel the vehicle;
  at least one sensor configured to measure orientation information of the board;
  a motor controller configured to receive orientation information measured by the at least one sensor and to cause the motor assembly to propel the vehicle based on the orientation information;
  a suspension system comprising a pair of Watt's linkages connecting opposing end portions of the axle to the frame, each of the Watt's linkages including a central link coupled to the axle of the wheel, a first pivoting link coupled to a first end portion of the central link at a first rotating joint and coupled to the first end portion of the frame at a second rotating joint, and a second pivoting link coupled to a second end portion of the central link at a third rotating joint and coupled to the second end portion of the frame at a fourth rotating joint, such that the board is configured to be movable up and down relative to the axle; and
  a shock absorber having a first end coupled to the pair of Watt's linkages and a second end coupled to the board, such that the shock absorber is configured to damp movement of the board relative to the axle.

D1. The vehicle of D0, wherein the first end of the shock absorber is coupled to a transverse member joining the pair of Watt's linkages and the second end of the shock absorber is coupled to the board by a rocker arm.

D2. The vehicle of D1, wherein the rocker arm is coupled to the transverse member by a linkage mechanism, such that movement of the Watt's linkages pivots the rocker arm relative to the board and changes an effective length of the shock absorber.

D3. The vehicle of any one of paragraphs D0 through D2, wherein the frame is coupled to the wheel assembly by only the suspension system.

D4. The vehicle of any one of paragraphs D0 through D3, wherein the second rotating joint and the fourth rotating joint are disposed below the deck portions of the board.

E0. A self-balancing electric vehicle, comprising:
  a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
  a wheel assembly including exactly one wheel rotatable on an axle, wherein the wheel is disposed between and extends above and below the first and second deck portions;
  a motor assembly configured to rotate the wheel about the axle to propel the vehicle;
  at least one sensor configured to measure orientation information of the board;
  a motor controller configured to receive orientation information measured by the at least one sensor and to cause the motor assembly to propel the vehicle based on the orientation information; and
  a suspension system coupling the wheel assembly to the board, such that the board is configured to be movable up and down relative to the axle, the suspension system including:
  a first and a second pivotable link, each of the pivotable links coupled at a proximal end to a respective end portion of the axle and coupled at a distal end to the first end portion of the frame by a distal rotating joint;
  a first bell crank and a second bell crank, the first and second bell cranks opposing each other across a width of the board, wherein each of the bell cranks respectively has a first and a second moving pivot and is rotatably coupled to the first end portion of the frame by a respective fixed pivot;
  a first pushrod coupling the first pivotable link to the first moving pivot of the first bell crank, and a second pushrod coupling the second pivotable link to the first moving pivot of the second bell crank; and
  a shock absorber having a first end coupled to the second moving pivot of the first bell crank and a second end coupled to the second moving pivot of the second bell crank, such that the shock absorber is configured to damp movement of the board relative to the axle.

E1. The vehicle of E0, wherein the first pushrod is coupled to the first pivotable link at a first rotating joint and coupled to the first bell crank at a second rotating joint, the first and second rotating joints having orthogonal axes of rotation.

E2. The vehicle of any one of paragraphs E0 through E1, further comprising a transverse member joining the distal ends of the first and second pivotable links.

E3. The vehicle of any one of paragraphs E0 through E2, wherein the bell cranks are disposed above a plane defined by the first deck portion.

E4. The vehicle of any one of paragraphs E0 through E3, wherein the frame is coupled to the wheel assembly by only the suspension system.

E5. The vehicle of E4, wherein the second end portion of the frame is unconnected to the suspension system.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A self-balancing electric vehicle, comprising:
a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
a wheel assembly including exactly one wheel rotatable on an axle, wherein the wheel is disposed between and extends above and below the first and second deck portions;
a motor assembly configured to rotate the wheel about the axle to propel the vehicle;
at least one sensor configured to measure orientation information of the board;
a motor controller configured to receive orientation information measured by the at least one sensor and to cause the motor assembly to propel the vehicle based on the orientation information;
a suspension system comprising a pair of Watt's linkages connecting opposing end portions of the axle to the frame, each of the Watt's linkages including a central link coupled to the axle of the wheel, a first pivoting link coupled to a first end portion of the central link at a first rotating joint and coupled to the first end portion of the frame at a second rotating joint, and a second pivoting link coupled to a second end portion of the central link at a third rotating joint and coupled to the second end portion of the frame at a fourth rotating joint, such that the board is configured to be movable up and down relative to the axle; and
a shock absorber having a first end coupled to the pair of Watt's linkages and a second end coupled to the board, such that the shock absorber is configured to damp movement of the board relative to the axle.

2. The vehicle of claim 1, wherein the first end of the shock absorber is coupled to a transverse member joining the pair of Watt's linkages and the second end of the shock absorber is coupled to the board by a rocker arm.

3. The vehicle of claim 2, wherein the rocker arm is coupled to the transverse member by a linkage mechanism, such that movement of the Watt's linkages pivots the rocker arm relative to the board and changes an effective length of the shock absorber.

4. The vehicle of claim 1, wherein the board is coupled to the wheel assembly by only the suspension system.

5. The vehicle of claim 1, wherein the second rotating joint and the fourth rotating joint are disposed below the board.

6. The vehicle of claim 5, wherein the shock absorber is disposed below the board.

7. The vehicle of claim 1, wherein the first and second rotating joints of each Watt's linkage are equidistant from the axle of the wheel.

8. A self-balancing electric vehicle, comprising:
a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
a wheel assembly including a wheel rotatable on an axle, wherein the wheel extends above and below the first and second deck portions;
a motor assembly configured to rotate the wheel about the axle to propel the vehicle;
at least one sensor configured to measure orientation information of the board;
a motor controller configured to receive orientation information measured by the at least one sensor and to cause the motor assembly to propel the vehicle based on the orientation information;
a suspension system comprising a pair of Watt's linkages connecting opposing end portions of the axle to the frame, each of the Watt's linkages including a central link coupled to the axle of the wheel, a first pivoting link coupled to a first end portion of the central link at a first rotating joint and coupled to the first end portion of the frame at a second rotating joint, and a second pivoting link coupled to a second end portion of the central link at a third rotating joint and coupled to the second end portion of the frame at a fourth rotating joint, such that the board is configured to be movable up and down relative to the axle; and
a shock absorber having a first end coupled to the pair of Watt's linkages and a second end coupled to the board, such that the shock absorber is configured to damp movement of the board relative to the axle.

9. The vehicle of claim 8, wherein the first end of the shock absorber is coupled to a transverse member extending between the first pivoting link of one of the Watt's linkages and the first pivoting link of the other of the Watt's linkages, and the second end of the shock absorber is coupled to the board by a rocker arm.

10. The vehicle of claim 8, wherein movement of the Watt's linkages changes an effective length of the shock absorber.

11. The vehicle of claim 8, wherein the board is coupled to the wheel assembly by only the suspension system.

12. The vehicle of claim 8, wherein the second rotating joint and the fourth rotating joint are disposed below the board.

13. The vehicle of claim 12, wherein the shock absorber is disposed below the board.

14. The vehicle of claim 8, wherein the first and second rotating joints of each Watt's linkage are equidistant from the axle of the wheel.

15. A self-balancing electric vehicle, comprising:
- a board defining a plane, the board including a first end portion and a second end portion, the first and second end portions each configured to receive a left or right foot of a rider oriented generally perpendicular to a direction of travel of the board;
- a wheel extending above and below the plane defined by the board;
- a motor assembly configured to rotate the wheel about an axle to propel the vehicle;
- at least one sensor configured to measure orientation information of the board;
- a motor controller configured to receive orientation information measured by the at least one sensor and to cause the motor assembly to propel the vehicle based on the orientation information;
- a suspension system comprising a pair of linkages connecting opposing end portions of the axle to the board, each of the linkages including a central link coupled to the axle of the wheel, a first pivoting link coupled to a first end portion of the central link at a first rotating joint and coupled to the first end portion of the board at a second rotating joint, and a second pivoting link coupled to a second end portion of the central link at a third rotating joint and coupled to the second end portion of the board at a fourth rotating joint, such that the board is configured to be movable up and down relative to the axle; and
- a shock absorber having a first end coupled to each of the linkages and a second end coupled to the board, such that the shock absorber is configured to damp movement of the board relative to the axle.

16. The vehicle of claim 15, further comprising a transverse member extending between and rigidly connecting the first pivoting link of one of the linkages and the first pivoting link of the other of the linkages, wherein the first end of the shock absorber is coupled to the transverse member.

17. The vehicle of claim 16, wherein the second end of the shock absorber is coupled to the board by a rocker arm.

18. The vehicle of claim 15, wherein the shock absorber is disposed entirely on one side of the plane defined by the board.

19. The vehicle of claim 15, wherein the first and second end portions of each central link are symmetrically disposed with respect to the axle of the wheel.

20. The vehicle of claim 15, wherein the vehicle includes exactly one wheel, and the wheel extends substantially equidistantly above and below the plane defined by the board.

* * * * *